US010346821B2

(12) United States Patent
Moshal

(10) Patent No.: US 10,346,821 B2
(45) Date of Patent: Jul. 9, 2019

(54) ONLINE PURCHASE PROCESSING SYSTEM AND METHOD

(71) Applicant: Gelliner Limited, Douglas (GB)

(72) Inventor: Martin Paul Moshal, Queens Way Quay (GI)

(73) Assignee: Gelliner Limited, Douglas (IM)

( * ) Notice: Subject to any disclaimer, the term of this patent is extended or adjusted under 35 U.S.C. 154(b) by 38 days.

(21) Appl. No.: 14/682,744

(22) Filed: Apr. 9, 2015

(65) Prior Publication Data

US 2015/0213529 A1  Jul. 30, 2015

Related U.S. Application Data

(63) Continuation of application No. 14/356,558, filed as application No. PCT/GB2012/052502 on Oct. 9, 2012.

(Continued)

(30) Foreign Application Priority Data

Nov. 10, 2011  (GB) .................................. 1119375.2

(51) Int. Cl.
  *G06K 19/00*   (2006.01)
  *G06Q 20/20*   (2012.01)
  (Continued)

(52) U.S. Cl.
  CPC ....... *G06Q 20/208* (2013.01); *G06F 16/9554* (2019.01); *G06K 7/1417* (2013.01);
  (Continued)

(58) Field of Classification Search
  USPC ......... 235/435, 439, 454, 462; 705/5, 35–45
  See application file for complete search history.

(56) References Cited

U.S. PATENT DOCUMENTS 6,108,656 A  8/2000 Durst et al.
6,144,959 A  11/2000 Anderson et al.
(Continued)

FOREIGN PATENT DOCUMENTS

CN  1598881 A  3/2005
EP  1195973 A1  4/2002
(Continued)

OTHER PUBLICATIONS

European Patent Office, communication pursuant to Article 94(3) EPC regarding application No. 12 777 941.1-955, dated Jan. 18, 2016, 8 pgs.
(Continued)

*Primary Examiner* — Matthew Mikels
(74) *Attorney, Agent, or Firm* — McDonnell Boehnen Hulbert & Berghoff LLP

(57) ABSTRACT

A system and method to use quick response (QR) codes encoded with merchant website identification codes and session GUID to register a user or code scanner with a merchant server, login the user or code scanner with the merchant server, and complete a purchase of an item or service within a virtual shopping cart of the merchant server. A code scanner can scan a QR code displayed on a device connected to the internet. An application server can receive an identification code from the code scanner and then transmit data indicating form fields to be filled in on a merchant webpage. A user profile can include data regarding the user and a payment instrument. The user profile data can prepopulate the form fields and the form field data can be transmitted to the merchant server to use for logging in the user and completing the purchase.

18 Claims, 18 Drawing Sheets

Related U.S. Application Data

(60) Provisional application No. 61/587,416, filed on Jan. 17, 2012.

(51) Int. Cl.

| | | |
|---|---|---|
| *G06Q 20/14* | (2012.01) | |
| *G06F 16/955* | (2019.01) | |
| *G06Q 20/22* | (2012.01) | |
| *G06Q 20/32* | (2012.01) | |
| *G06Q 20/38* | (2012.01) | |
| *G06Q 20/40* | (2012.01) | |
| *G06Q 20/42* | (2012.01) | |
| *G06Q 30/06* | (2012.01) | |
| *G06Q 30/02* | (2012.01) | |
| *G06Q 20/10* | (2012.01) | |
| *G06Q 20/12* | (2012.01) | |
| *G06K 7/14* | (2006.01) | |
| *G06Q 30/00* | (2012.01) | |
| *H04L 9/08* | (2006.01) | |
| *H04L 29/06* | (2006.01) | |
| *G06K 19/06* | (2006.01) | |

(52) U.S. Cl.
CPC ..... *G06K 19/06037* (2013.01); *G06Q 20/102* (2013.01); *G06Q 20/12* (2013.01); *G06Q 20/14* (2013.01); *G06Q 20/145* (2013.01); *G06Q 20/223* (2013.01); *G06Q 20/322* (2013.01); *G06Q 20/3255* (2013.01); *G06Q 20/3276* (2013.01); *G06Q 20/387* (2013.01); *G06Q 20/3829* (2013.01); *G06Q 20/40* (2013.01); *G06Q 20/4014* (2013.01); *G06Q 20/425* (2013.01); *G06Q 30/0185* (2013.01); *G06Q 30/02* (2013.01); *G06Q 30/0225* (2013.01); *G06Q 30/06* (2013.01); *G06Q 30/0609* (2013.01); *G06Q 30/0633* (2013.01); *H04L 9/0819* (2013.01); *H04L 63/083* (2013.01); *G06Q 2220/10* (2013.01)

(56) References Cited

U.S. PATENT DOCUMENTS

| | | | |
|---|---|---|---|
| 6,151,426 A | 11/2000 | Lee et al. | |
| 6,577,861 B2 | 6/2003 | Ogasawara | |
| 7,080,327 B1 | 7/2006 | Bartz et al. | |
| 7,083,087 B1 | 8/2006 | Gangi | |
| 7,349,884 B1 | 3/2008 | Odom et al. | |
| 7,594,189 B1* | 9/2009 | Walker | G06F 17/30867 715/811 |
| 2001/0037297 A1 | 11/2001 | McNair | |
| 2001/0047428 A1 | 11/2001 | Hunter et al. | |
| 2002/0128967 A1 | 9/2002 | Meyer et al. | |
| 2003/0177090 A1 | 9/2003 | Eden | |
| 2004/0235455 A1 | 11/2004 | Jiang | |
| 2005/0060261 A1 | 3/2005 | Remington et al. | |
| 2005/0096011 A1 | 5/2005 | Yoshida et al. | |
| 2005/0211771 A1 | 9/2005 | Dnozu | |
| 2005/0269399 A1 | 12/2005 | Bensimon et al. | |
| 2006/0026140 A1 | 2/2006 | King et al. | |
| 2006/0047725 A1 | 3/2006 | Bramson | |
| 2007/0174206 A1 | 7/2007 | Colella | |
| 2007/0299775 A1* | 12/2007 | Algiene | G06Q 20/042 705/45 |
| 2007/0300142 A1 | 12/2007 | King et al. | |
| 2008/0002882 A1 | 1/2008 | Voloshynovskyy et al. | |
| 2008/0040265 A1 | 2/2008 | Rackley, III et al. | |
| 2008/0059372 A1 | 3/2008 | Lee et al. | |
| 2008/0189208 A1 | 8/2008 | Wilkie | |
| 2008/0222048 A1 | 9/2008 | Higgins et al. | |
| 2008/0284185 A1 | 11/2008 | Pixley | |
| 2008/0301444 A1* | 12/2008 | Kim | H04L 63/08 713/169 |
| 2009/0006254 A1 | 1/2009 | Mumm et al. | |
| 2009/0051665 A1 | 2/2009 | Jang et al. | |
| 2009/0132381 A1 | 5/2009 | Gangi | |
| 2009/0173784 A1 | 7/2009 | Yang | |
| 2009/0265231 A1 | 10/2009 | Evanitsky | |
| 2009/0307132 A1 | 12/2009 | Phillips | |
| 2009/0319425 A1 | 12/2009 | Tumminaro et al. | |
| 2010/0046811 A1* | 2/2010 | Harris | G06K 9/00 382/124 |
| 2010/0070759 A1* | 3/2010 | Leon Cobos | G06F 21/43 713/155 |
| 2010/0260388 A1 | 10/2010 | Garrett et al. | |
| 2010/0287606 A1 | 11/2010 | Machani | |
| 2010/0320266 A1 | 12/2010 | White | |
| 2011/0137742 A1 | 6/2011 | Parikh et al. | |
| 2011/0184843 A1 | 7/2011 | Orttung et al. | |
| 2011/0210922 A1 | 9/2011 | Griffin | |
| 2011/0246070 A1 | 10/2011 | Fitzpatrick et al. | |
| 2011/0251892 A1 | 10/2011 | Laracey | |
| 2011/0251910 A1 | 10/2011 | Dimmick | |
| 2011/0313893 A1 | 12/2011 | Weik, III | |
| 2012/0095791 A1 | 4/2012 | Stefik et al. | |
| 2012/0221659 A1* | 8/2012 | Brown | G06F 17/30731 709/206 |
| 2012/0234906 A1 | 9/2012 | Ganapathi | |
| 2012/0265585 A1 | 10/2012 | Muirbrook et al. | |
| 2012/0284185 A1 | 11/2012 | Mettler et al. | |
| 2012/0317156 A1 | 12/2012 | Tomita | |
| 2014/0289107 A1 | 9/2014 | Moshal | |
| 2014/0310117 A1 | 10/2014 | Moshal | |
| 2014/0316991 A1 | 10/2014 | Moshal | |
| 2015/0324777 A1 | 11/2015 | Moshal | |
| 2017/0032350 A1 | 2/2017 | Moshal | |

FOREIGN PATENT DOCUMENTS

| | | |
|---|---|---|
| EP | 1587014 A1 | 10/2005 |
| JP | 2001319155 A | 11/2001 |
| JP | 2003141689 A | 5/2003 |
| JP | 2004280626 | 10/2004 |
| JP | 2005100429 A | 4/2005 |
| JP | 2006268446 A | 10/2006 |
| JP | 2007086915 A | 4/2007 |
| JP | 2007-166123 A | 6/2007 |
| JP | 2007-323613 A | 12/2007 |
| JP | 2008129635 A | 6/2008 |
| JP | 2008-257540 A | 10/2008 |
| JP | 2009-111871 A | 5/2009 |
| JP | 2009-129097 A | 6/2009 |
| JP | 1305847 B2 | 7/2009 |
| JP | 2010-026608 A | 2/2010 |
| JP | 2010128736 A1 | 6/2010 |
| JP | 2010-526368 A | 7/2010 |
| JP | 2010-277580 A | 12/2010 |
| JP | 2011210171 A | 10/2011 |
| JP | 2012190308 | 10/2012 |
| KR | 10-2003-0076815 | 9/2003 |
| KR | 1020070055069 | 5/2007 |
| KR | 10-2007-0065958 | 6/2007 |
| KR | 10-2009-0066516 | 6/2009 |
| KR | 10-2010-0045586 | 5/2010 |
| KR | 10-2011-0006734 | 1/2011 |
| KR | 1020110006732 | 1/2011 |
| KR | 10-2011-0038358 A | 4/2011 |
| KR | 10-2011-00383358 | 4/2011 |
| KR | 10-2011-0066841 | 6/2011 |
| KR | 10-2011-0098247 A | 9/2011 |
| KR | 10-2011-0112142 | 10/2011 |
| KR | 102012026221 | 3/2012 |
| KR | 1020120097789 | 9/2012 |
| WO | 9904326 A2 | 1/1999 |
| WO | 00/60484 A1 | 10/2000 |
| WO | 02/080015 A1 | 10/2002 |
| WO | 2005/111950 A1 | 11/2005 |
| WO | 2008/136764 A1 | 11/2008 |
| WO | 2010/013296 A1 | 2/2010 |
| WO | 2011/003467 A1 | 1/2011 |

(56) References Cited

FOREIGN PATENT DOCUMENTS

| WO | 2013068765 A1 | 5/2013 |
|---|---|---|
| WO | 2013068767 A1 | 5/2013 |
| WO | 2013068768 A1 | 5/2013 |

OTHER PUBLICATIONS

Office Action issued in Japanese Patent Application No. 2014-540547 dated Oct. 26, 2016 (4 pages, plus 3-page English translation).

Jaesik Lee et al, Secure quick response-payment (QR-Pay) system using mobile device:, Advanced Communication Technology (ICACVT), 2011 13th International Conference on, IEEE, Feb. 13, 2011, pp. 1424-1427.

Jerry Gao et al, "A 2D Barcode-Based Mobile Payment System", Multimedia and Ubiquitous Engineering, 2009, MUE '09 Third International Conference on, IEEE, Piscataway, NJ, USA Jun. 4, 2009, pp. 320-329.

Open Mobile Alliance LTD, "White Paper on Mobile Codes", OMA-WP-Mobile-Codes-20081024-A, Oct. 24, 2008, pp. 1-26.

International Searching Authority at European Patent Office, Patent Cooperation Treaty PCT, International Search Report (PCT Articlel 8 and Rules 43 and 44) for International Application No. PCT/GB2012/052502, dated Jan. 24, 2013, 4 pages.

International Searching Authority at European Patent Office, Patent Cooperation Treaty PCT Written Opinion of the International Searching Authority, for International Application No. PCT/GB2012/052502, opinion completion date Jan. 14, 2013, 6 pages.

U.S. Appl. No. 14/356,552, filed May 6, 2014, inventor: Martin Paul Moshal.

U.S. Appl. No. 14/682,660, filed Apr. 9, 2015, inventor: Martin Paul Moshal.

U.S. Appl. No. 14/682,704, filed Apr. 9, 2015, inventor: Martin Paul Moshal.

U.S. Appl. No. 14/682,775, filed Apr. 9, 2015, inventor: Martin Paul Moshal.

Office action from Korean Patent Application No. 10-2014-7015716 dated Jan. 21, 2019, 5 pages (with English translation 3 pages).

Office action from Korean Patent Application No. 10-2014-7015716 dated Jun. 19, 2018, 9 pages (with English translation 9 pages).

Guide for purchasing smart phone, Windows for adults, Japan, Inforest Co., Ltd., May 1, 2011, vol. 33, p. 32 (with original office action and English translation of office action citing literature).

European Patent Office, summons to attend oral proceeding pursuant to Rule 115(1) EPC, European patent application No. 12777941, dated Mar. 26, 2019.

\* cited by examiner

Figure 2:
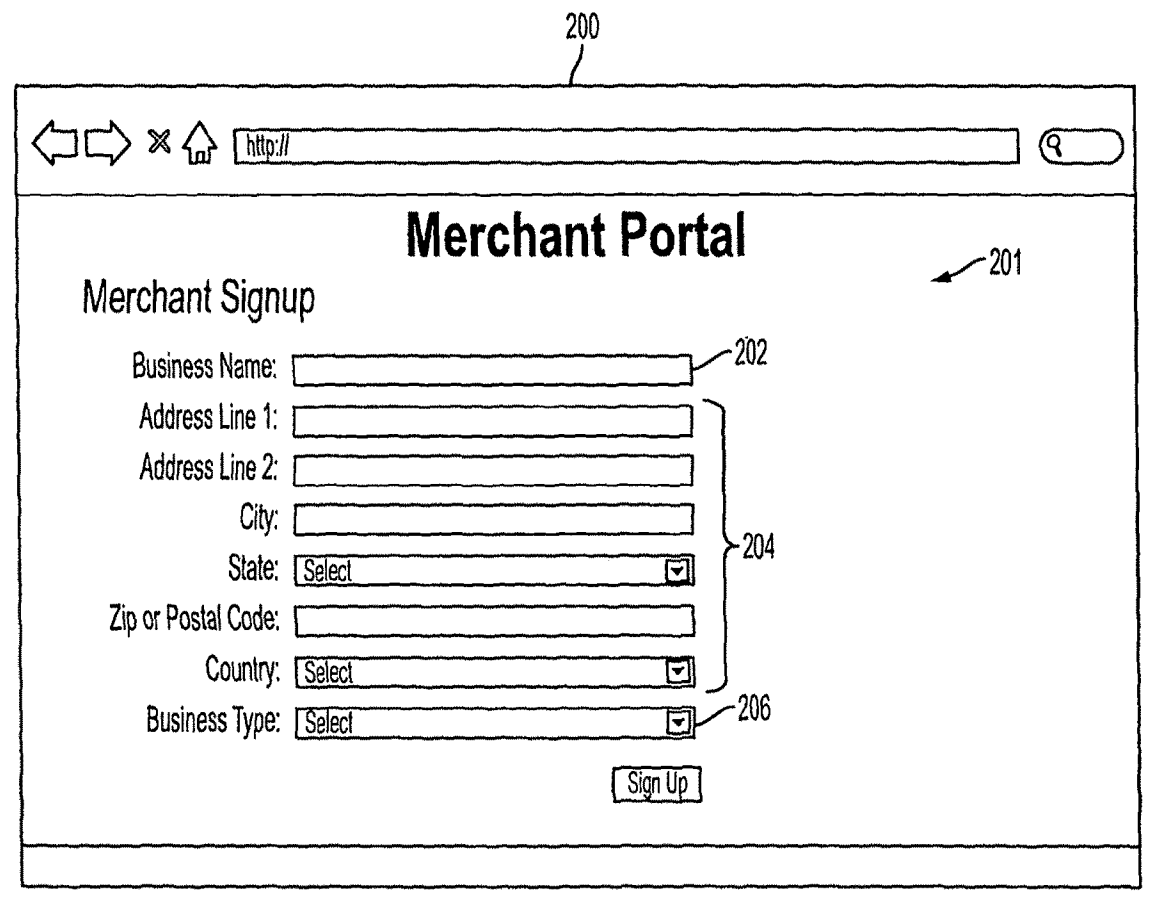

Merchant Portal

Merchant Signup

Business Name:
Address Line 1:
Address Line 2:
City:
State: Select
Zip or Postal Code:
Country: Select
Business Type: Select Sign Up

ONLINE PURCHASE PROCESSING SYSTEM AND METHOD

PRIORITY CLAIMS

This application claims the benefit of GB Application No. 1119375.2, filed Nov. 10, 2011, and claims the benefit of U.S. Provisional Application No. 61/587,416, filed Jan. 17, 2012. GB Application 1119375.2 and U.S. Provisional Application No. 61/587,416 are incorporated herein by reference for all purposes.

BACKGROUND

Online purchasing of goods or services from an e-commerce website generally includes at least three stages, namely registration, login, and purchase.

A user who accesses a conventional online merchant website for the first time can generally browse and select a number of items offered by the merchant, either goods or services, which the user wishes to purchase. The selected items are added to a virtual shopping cart. When then user's selection is complete, the user navigates to a checkout section of the merchant website. The user is usually required to register by completing a registration form. Registration particulars that can be required vary from one merchant website to another but typically include the user's first name, last name, email address, a selected password (usually entered twice, for safety), a physical address, and telephone number. The user can be required to formulate one or more security questions together with corresponding answers, or to answer some predetermined security questions.

It is known that such a registration process is time-consuming and tedious, involving several steps, causing a significant proportion of users to become discouraged and to leave the registration process and to abandon the virtual shopping cart altogether without completing a purchase. The merchant is left with no information about users who do not complete the registration process.

It is nevertheless desirable for merchant websites to persist with comprehensive registration requirements in order to be able to track their registered users and monitor which users are showing interest in the website, and to identify their likes and dislikes. Thus, a registration process gives rise to a trade-off between user drop-off (i.e. users who do not complete the registration process) and the ability to gain good insight into users who do complete the registration process.

If, on the other hand, the user who navigates to the checkout section of the merchant website has previously registered with the site, the user will still be required to login to the site in order to authenticate the user and complete the user's purchase. This will require the user to memorize a username (for example an email address) and a password corresponding to the merchant website. As the user registers with more merchant websites, the number of unique username and password combinations that must be memorized increases, which is cumbersome. In order to alleviate this difficulty, the user can record the username and password combinations, for example on paper or digitally, resulting in decreased security. Alternatively, the user can employ the same username and password combination across multiple merchant websites, which is contrary to best practice.

The applicant has appreciated the desirability of a simpler process for conducting online purchases than that described above.

OVERVIEW

Example embodiments are described herein. In one respect, an example embodiment takes the form of a method comprising (i) decoding, at a code scanner, a registration quick response (QR) code scanned by the code scanner from a webpage of a merchant server, (ii) transmitting, from the code scanner to a call-back registration uniform resource locator (URL) of the merchant server, registration data to register a user with merchant server, (iii) receiving, at the code scanner after registration of the user, login credentials for logging the registered user onto the merchant server, and (iv) storing the login credentials at the code scanner.

In another respect, an example embodiment takes the form of a code scanner device comprising: (i) a scanner that scans a registration QR code from a webpage of a merchant server, (ii) a processor, (iii) a non-transitory computer-readable data storage device comprising computer-readable program instructions, wherein the program instructions are executable by the processor to decode the registration QR code, and (iv) a network interface to transmit, to a call-back registration URL of the merchant server, registration data for registering a user with the merchant server, and to receive login credentials useable for logging the registered user onto the merchant server, wherein the data storage device stores the received login credentials.

In yet another respect, an example embodiment takes the form of a method comprising: (i) decoding, at a code scanner, a login QR code scanned by the code scanner from a webpage of a merchant server, and (ii) determining, using the code scanner, whether the code scanner includes login credentials for logging onto the merchant server. If the code scanner determines that the code scanner includes the login credentials for logging onto the merchant server, then transmitting, from the code scanner to a call-back login URL of the merchant server, the login credentials for logging onto merchant server. If the code scanner determines that the code scanner does not include the login credentials for logging onto the merchant server, then initiating, using the code scanner, a process to register a user with the merchant server.

In yet another respect, an example embodiment takes the form of a code scanner device comprising: (i) a scanner that scans a login QR code from a webpage of a merchant server, (ii) a network interface, (iii) a processor, and (iv) a non-transitory computer-readable data storage device comprising computer-readable program instructions, wherein the program instructions are executable by the processor to decode the login QR code and to determine whether the code scanner device comprises login credentials for logging onto the merchant server. If the processor determines that the login credentials for logging onto the merchant server are stored within the data storage device, then the network interface transmits, to a call-back login URL of the merchant server, the login credentials for logging onto merchant server. If the processor determines that the login credentials for logging onto the merchant server are not stored within the data storage device, then the processor initiates a process to register a user with the merchant server.

In yet another respect, an example embodiment takes the form of a method comprising: (i) decoding, at a code scanner, a checkout QR code scanned by the code scanner from a webpage of a merchant server, (ii) transmitting, from the code scanner to a call-back checkout URL of the merchant server, purchase-data to purchase an item within a virtual shopping cart of the merchant server, (iii) displaying, at the code scanner, a payment amount due that is to be paid to purchase the item within the virtual shopping cart, and (iv) transmitting, from the code scanner to the merchant server, payment instrument data for processing payment of the payment amount to complete a purchase of the item within the virtual shopping cart.

In yet another respect, an example embodiment takes the form of a code scanner device comprising: (i) a scanner that scans a checkout QR code from a webpage of a merchant server, (ii) a processor, (iii) a non-transitory computer-readable data storage device comprising computer-readable program instructions, wherein the program instructions are executable by the processor to decode the checkout QR code, (iv) a network interface that transmits, to a call-back checkout URL, purchase-data to purchase an item within a virtual shopping cart of the merchant server, and (v) a display device that displays a payment amount that is to be paid to purchase the item within the virtual shopping cart. The network interface transmits, to the merchant server, payment instrument data for processing payment of the payment amount to complete a purchase of the item within the virtual shopping cart.

In yet another respect, an example embodiment takes the form of a method comprising: (i) storing, in a non-transitory computer-readable data storage device, a first merchant website identification code and a first call-back URL, wherein the first merchant website identification code and the first call-back URL are associated with each other, (ii) receiving, at the application server from a first code scanner, the first merchant website identification code, (iii) selecting, from the data storage device, the first call-back URL associated with the first merchant website identification code, and (iv) transmitting, from the application server to the first code scanner in response to receiving the first merchant website identification code, the first call back URL.

In still yet another respect, an example embodiment takes the form of an application server system comprising: (i) a processor, (ii) a non-transitory computer-readable data storage device comprising a merchant website identification code, a call-back URL, and computer-readable program instructions executable by the processor, wherein the merchant website identification code and the call-back URL are associated with each other, and (iii) a network interface that receives, from a code scanner, the merchant website identification code. The processor executes the program instructions to select the call-back URL in response to the network interface receiving the merchant website identification code. The processor executes the program instructions to cause the network interface to transmit, to the code scanner, the call-back URL selected in response to the network interface receiving the merchant website identification code.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings, in which:

FIG. 2 is a representation of a webpage of a merchant portal website hosted on an application server in the system of FIG. 1;

DETAILED DESCRIPTION

I. Introduction

This description describes, among other things, example embodiments with respect to registering with a merchant server, logging onto or onto a merchant server, or completing an online purchase of an item from the merchant server. In this description, the articles "a" or "an" are used to introduce elements of the example embodiments. The intent of using those articles is that there is one or more of the elements. The intent of using the conjunction "or" within a described list of at least 2 terms is to indicate that any of the listed terms or any combination of the listed terms. The terms "first" and "second" are used to distinguish respective elements and are not used to denote a particular order of those elements.

The following abbreviations or acronyms are used in the description:
  CVC—Card Verification Code;
  FIG.—Figure;
  FIGS.—Figures;
  GUID—Globally Unique Identifier;
  Inc.—Incorporated;
  PIN—Personal Identification Number;
  QR—Quick Response;
  Scanner App—Scanner Application Program; and
  URL—Uniform Resource Locator.

II. Example Architecture

Figure 1:
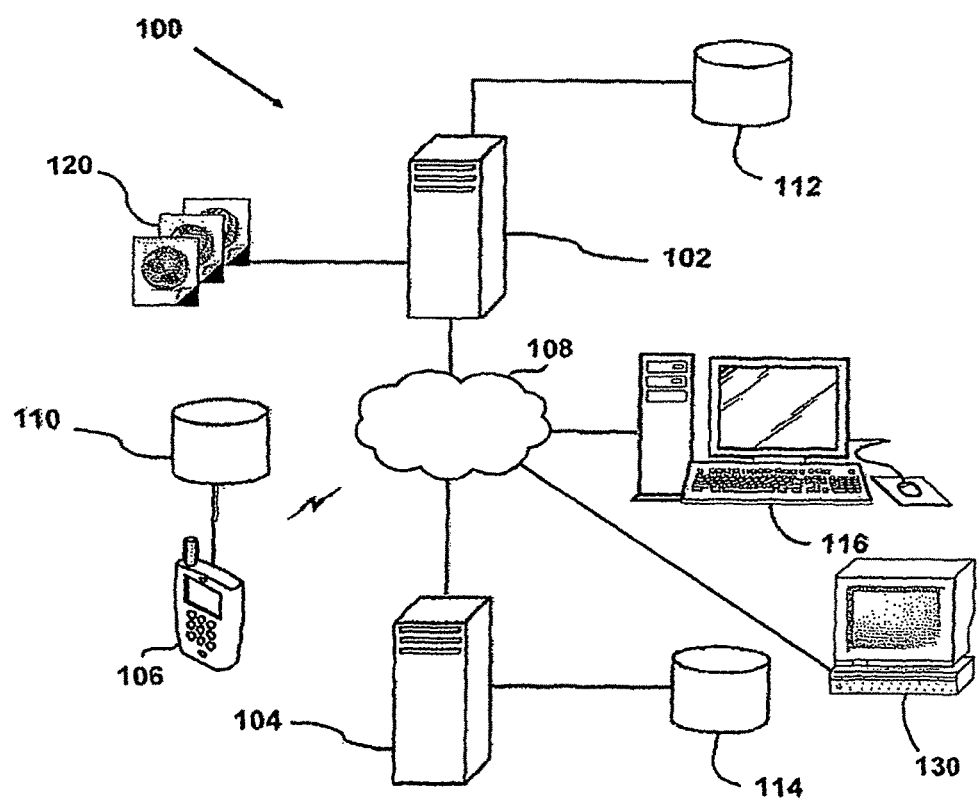
FIG. 1 is a schematic representation of a system for conducting online purchases from a merchant website.

FIG. 1 depicts a schematic representation of a system 100 for conducting online purchases from a merchant website in accordance with example embodiments described herein. The system 100 includes an application server 102, a merchant server 104 which a merchant uses to operate an online merchant website (not shown) offering goods or services for sale, and a code scanner 106 device configured to scan and decode Quick Response (QR) codes which are well known and widely used. The code scanner 106 can take the form of a conventional smartphone handset provisioned with software for scanning QR codes, a web browser, and a wireless connection to the internet. The code scanner 106 can be referred to as "mobile wireless communication device," a "mobile smartphone handset" or, more simply, a "mobile smartphone" or "smartphone." As an example, the mobile wireless communication device can be a personal digital assistant or a cellular telephone. As another example, the mobile wireless communication device can be an iPhone, such as the iPhone5, or an iPad sold by Apple Inc., Cupertino, Calif., United States. The code scanner 106 does not need to be a mobile device, but can be a device that remains attached to a stationary internet-enabled device. The application server 102, the merchant server 104, and the code scanner 106 can communicate with each other using a communication network 108. The communication network 108 can comprise a wide-area network, such as the internet.

Communication between the application server 102 and the code scanner 106 can be facilitated by using a server-hosted program (not shown) and a scanner application program (a 'scanner app') that is installed and executed on the code scanner 106. In another respect, communication between the application server 102 and code scanner 106 can occur using network interface 152 (shown in FIG. 15) and network interface 176 (shown in FIG. 17).

A user can download a copy of the scanner app from a download repository (for example, data storage device 178 in FIG. 16) and install the scanner app on the code scanner 106. On, during, or after installation, the scanner app creates a user profile 110 on the code scanner 106 and prompts the user to manually provide personal attributes such as, the user's first name, the user's last name, a default username and password combination, an e-mail address, a physical address and particulars of one or more payment instruments such as credit cards, debit cards, e-wallets and the like. In accordance with at least some example embodiments, the user profile 110 (for example, the data in the user profile 110) is stored locally on the code scanner 106 and is not passed to the application server 102.

The application server 102 hosts a merchant portal website 120 that enables online merchants to register and create individual merchant profiles that are maintained by the application server 102 in a merchant database 112. The merchant portal website 120 can be referred to as a "portal website." Merchant registration and creation of a merchant profile in the merchant database 112 can be performed online by the merchant portal website 120. A merchant can use a merchant computing device 130 including a display for displaying websites to display merchant portal websites and an input device for selecting or entering data onto the merchant portal websites.

FIG. 2 shows an example webpage 200 of the merchant portal website 120. The webpage 200 can display a registration form 201 that a merchant can complete in order to register with the merchant portal website 120. The webpage 200 can be a homepage of the merchant portal website 120.

As an example, the registration form 201 can include the following fields: a merchant's business name 202, a merchant's business address 204, and a description of the merchant's business 206. As an example, the business description can be a shoe store, an automobile parts store, a sports equipment store, or some other business description. Other examples of fields on the registration form 201 are possible. Entering data into the registration form 201 can occur, for example, by typing data or selecting data from a list of predetermined data.

Figure 3:
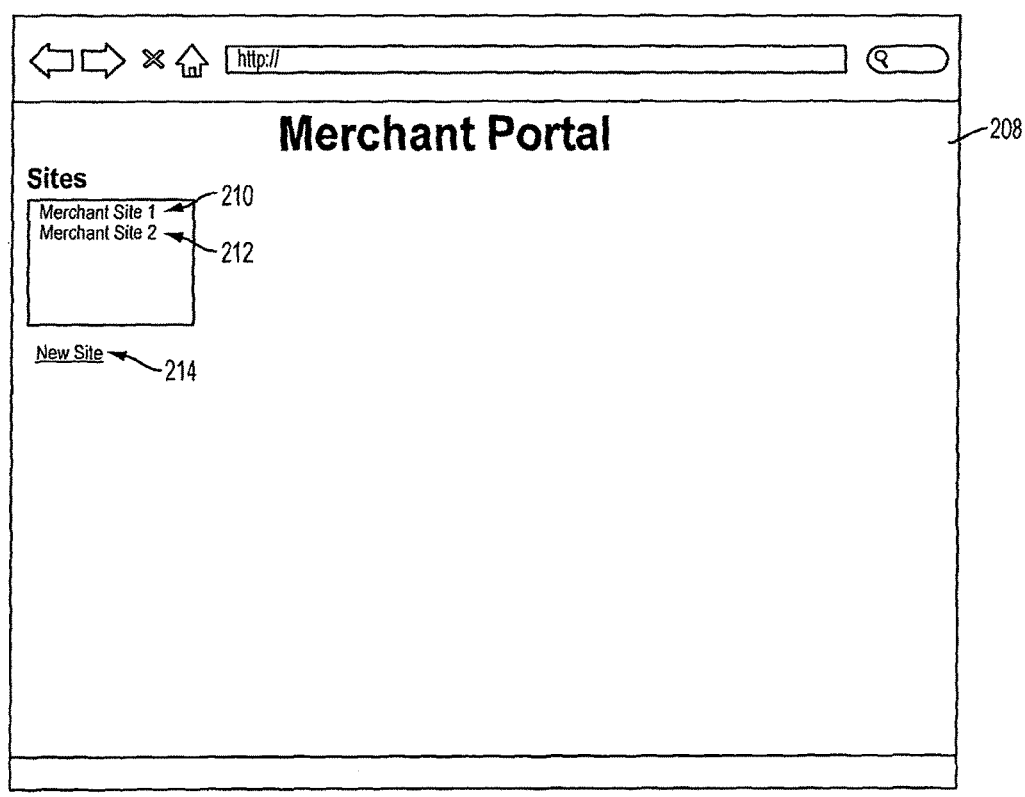
FIG. 3 illustrates a subsequent page of the merchant portal website of FIG. 2.

FIG. 3 shows another webpage 208 of the merchant portal website 120. The merchant can use webpage 208 to add, delete, or edit any of the merchant's websites online that the merchant wishes to configure for QR-based registration, login (for example, logon) or purchasing. The webpage 208 displays merchant websites 210 and 212, shown as Merchant Site 1 and Merchant Site 2 respectively, that have been registered with merchant portal website 120. The webpage 208 displays an icon 214 that is selectable (for example, by a merchant) to configure an additional merchant website for QR-based registration, login, or purchasing. Icon 214 can be a hyperlink.

Figure 4:
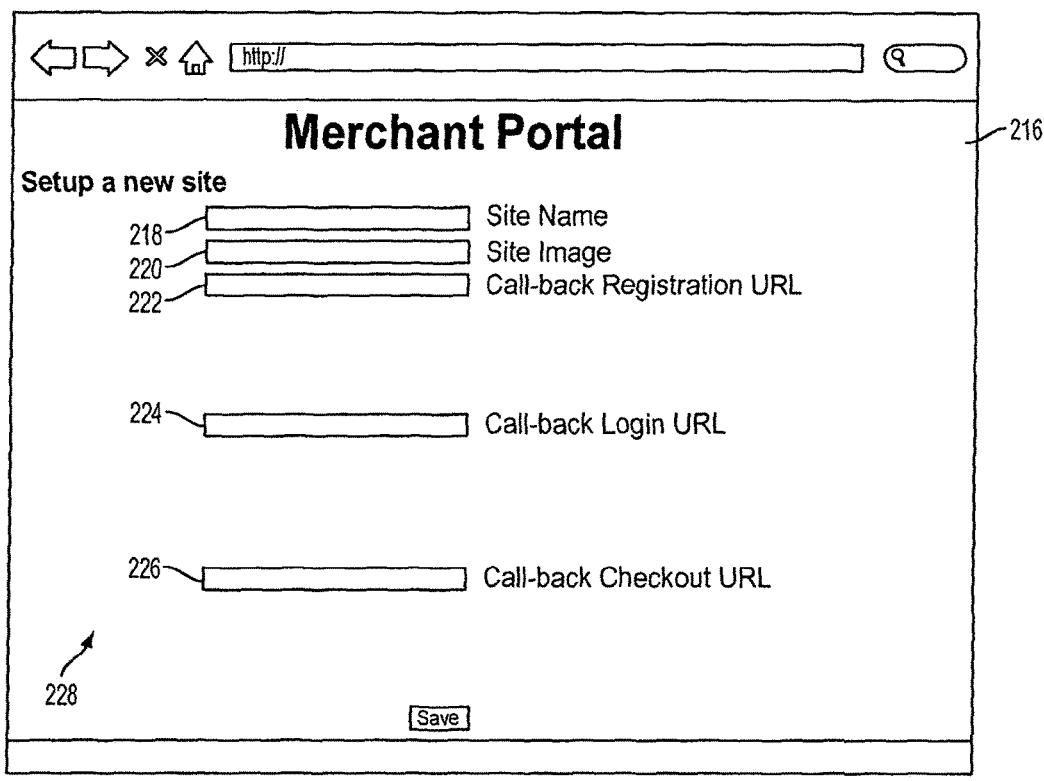
FIG. 4 illustrates a further page of the merchant portal website of FIG. 3.

FIG. 4 illustrates another example webpage 216 of the merchant portal website 120. The webpage 216 can display a configuration form 228 for configuring websites (for example, websites 210 and 212) registered with merchant portal website 120. As an example, the configuration form 228 can include the following fields: a name of the respective merchant website 218, an image or logo 220 associated with the respective merchant website, a URL 222 of a call-back registration page of the merchant website, a URL 224 of a call-back login page of the merchant website, and a URL 226 of a call-back checkout page of the merchant website. An image or logo entered via image or logo field 220 can be displayed on a scanner app display (for example, scanner app display 950 shown in FIG. 12).

A merchant can, in this manner, configure one or more online websites for QR-based registration, login or checkout by providing these additional configuration parameters for each merchant website. The application server 102 can assign a unique merchant website identification code to each merchant website configured in this manner and the website identification code is stored in the merchant's profile in the merchant database 112. Additionally or alternatively, each merchant website identification code can be provided to and stored with a QR source that serves QR codes to the merchant server 104. For the sake of being brief, a merchant website identification code can be referred to as a "website identification code" or an "identification code."

The merchant server 104 can maintain, in a customer database 114, individual profiles of customers registered with the merchant websites. In this description the terms 'user' and 'customer' and 'purchaser' are used interchangeably depending on the context. For example a user, once registered with the merchant website, becomes a customer of the merchant.

Figure 14:
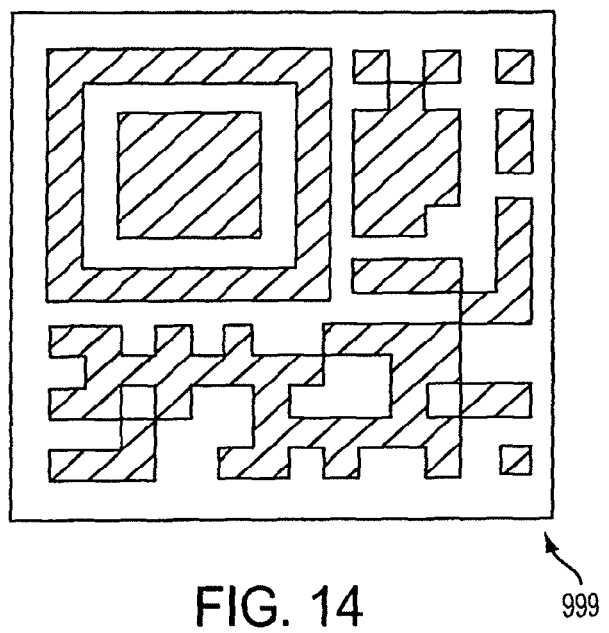
FIG. 14 illustrates an example quick response (QR) code.

FIG. 14 illustrates an example QR code 999. QR code 999 can be encoded as a registration QR code. Alternatively, QR code 999 can be encoded as a log-in QR code. Alternatively, QR code 999 can be encoded as a checkout QR code.

Figure 15:
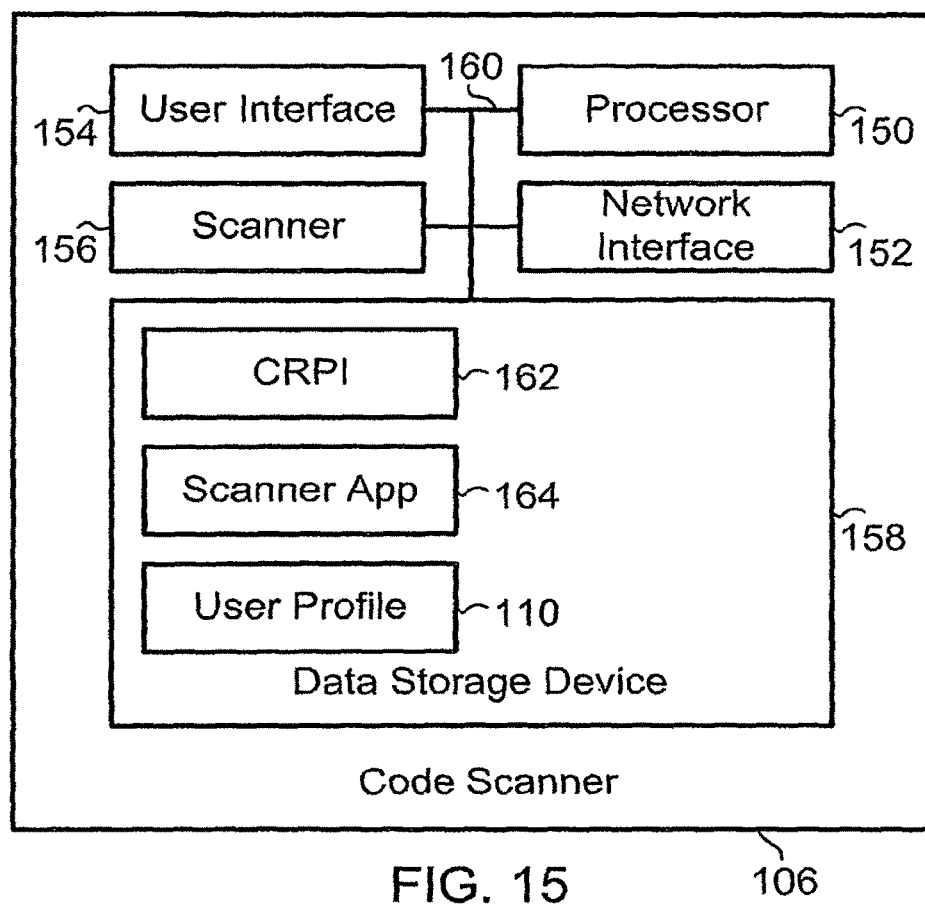
FIG. 15 is a block diagram of a code scanner in accordance with an example embodiment.

Next, FIG. 15 is a block diagram depicting an example embodiment of code scanner 106. As shown in FIG. 15, code scanner 106 includes (i) a processor 150, (ii) a network interface 152 for transmitting data to and receiving data from communication network 108, (iii) a user interface 154, (iv) a scanner 156 configured to scan (for example, capture) QR codes, and (v) a data storage device 158, all of which can be linked together via a system bus or other connection mechanism 160. Data storage device 158 includes computer-readable program instructions (CRPI) 162, the scanner app 164, and a user profile 110. CRPI 162 can include the scanner app 164. Data storage device 158 can comprise a non-transitory computer-readable storage medium readable by processor 150. Each computer-readable storage medium described herein can comprise volatile and/or non-volatile storage components, such as optical, magnetic, organic or other memory or disc storage, which can be integrated in whole or in part with a processor.

Each processor described herein can comprise one or more general purpose processors (for example, INTEL single core microprocessors or INTEL multicore microprocessors) or one or more special purpose processors (for example, digital signal processors). Processor 150 is configured to execute CRPI 162.

Figure 16:
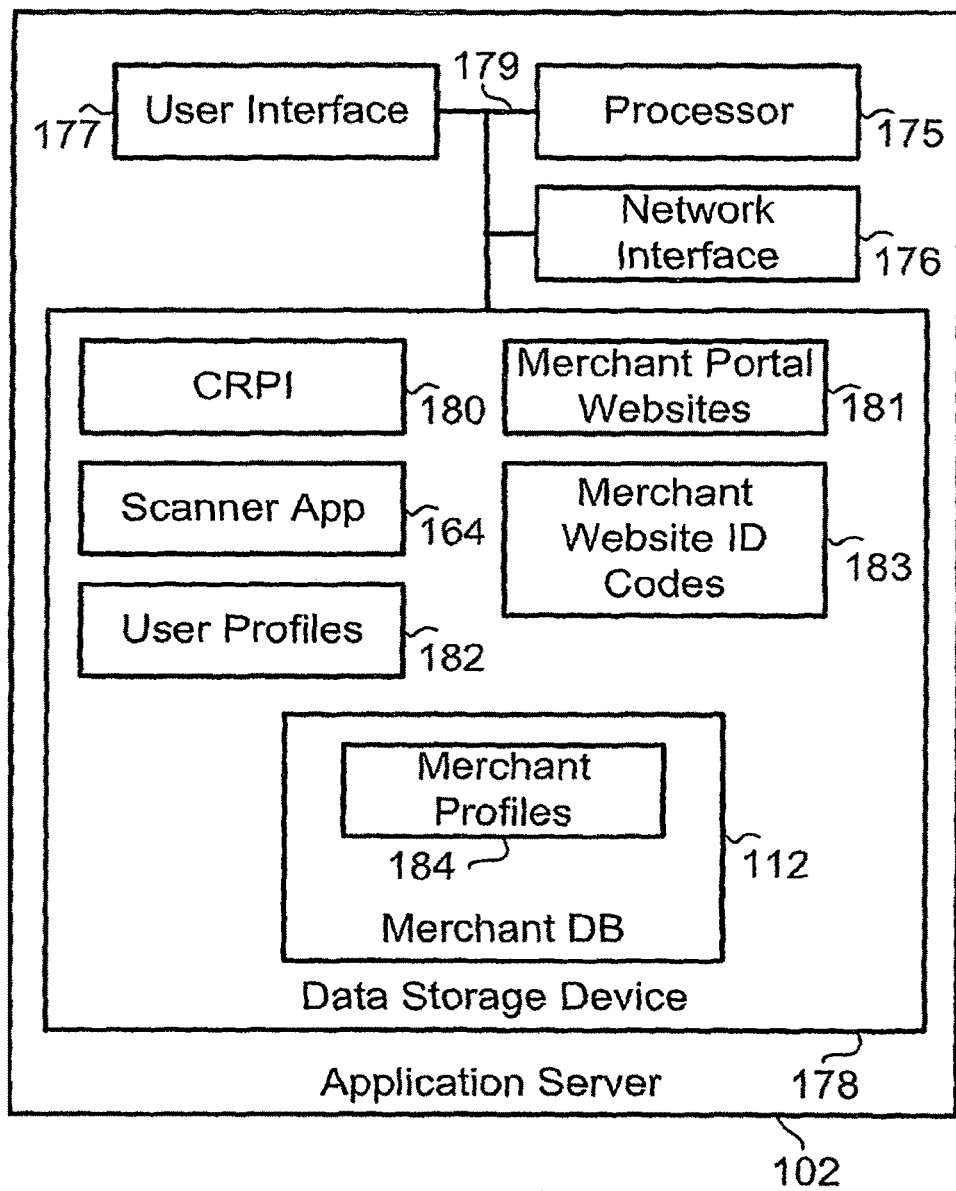
FIG. 16 is a block diagram of an application server in accordance with an example embodiment.

Next, FIG. 16 is a block diagram depicting an example embodiment of application server 102. As shown in FIG. 16, application server 102 can include (i) a processor 175, (ii) a network interface 176 for transmitting data to and receiving data from communication network 108, (iii) a user interface 177, and (iv) a data storage device 178, all of which can be linked together via a system bus or other connection mechanism 179. Data storage device 178 can include (i) CRPI 180, (ii) the scanner app 164 for downloading to code scanners, (iii) merchant portal websites 181, such as merchant portal website 120, (iv) user profiles 182, (v) merchant website identification codes 183 for merchant websites, checkout websites, or some other websites, and (vi) merchant database 112 including merchant profiles 184. CRPI 180 can include the scanner app 164. Data storage device 178 can comprise a non-transitory computer-readable storage medium readable by processor 175. Processor 175 is configured to execute CRPI 180.

Figure 18:
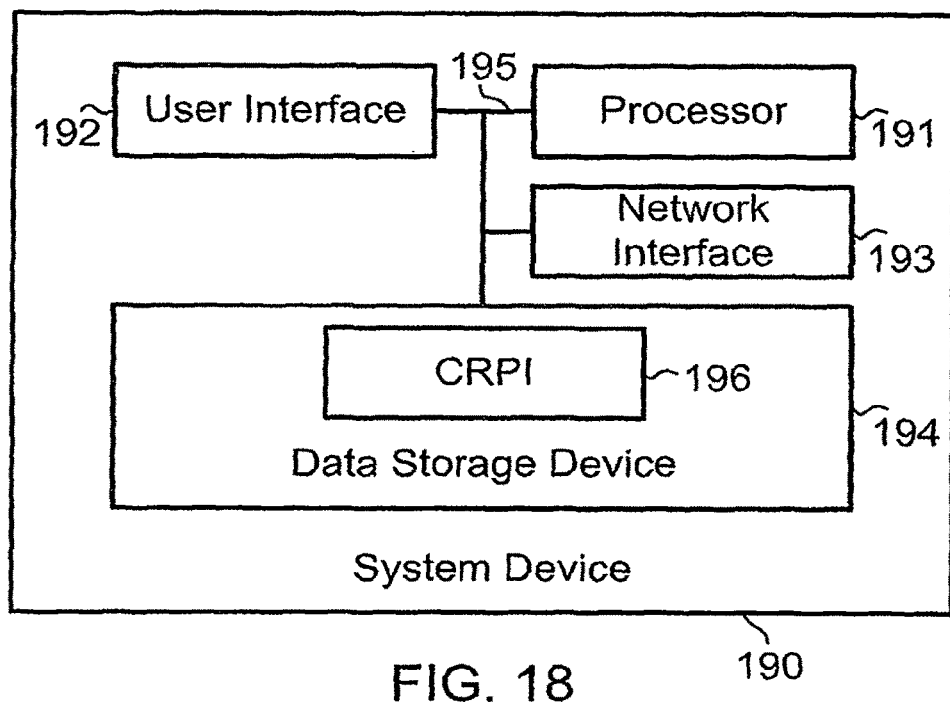
FIG. 18 is a block diagram of a system device in accordance with an example embodiment.

Next, FIG. 18 is a block diagram depicting a system device 190 in accordance with an example embodiment. As example, the merchant server 104, the internet-enabled device 116, or the merchant computing device 130 can be configured as system device 190. As shown in FIG. 18, system device 190 includes (i) a processor 191, (ii) a user interface 192, (iii) a network interface 193 for transmitting data to and receiving data from communication network 108, (iv) and a data storage device 194, all of which can be linked together via a system bus or other connection mechanism 195. Data storage device 194 includes CRPI 196. Data storage device 194 can comprise a non-transitory computer-readable storage medium readable by processor 191. Processor 191 is configured to execute CRPI 196. User interface 192 can comprise a display device that is configured to display webpages.

In accordance with an embodiment in which the merchant server 104 is configured as the system device 190, the CRPI 196 can comprise program instructions to carry out the functions described herein as being carried out by the merchant server 104. In accordance with an embodiment in which the internet-enabled device 116 is configured as the system device 190, CRPI 196 can comprise program instructions to carry out the functions described herein as being carried out by the Internet-enabled device 116. In accordance with an embodiment in which the merchant server 104 is configured as the merchant computing device 130, the CRPI 196 can comprise program instructions to carry out the functions described herein as being carried out by the merchant computing device 130.

III. Example Operation

A. QR-Based Registration

The system 100 can be used to register a non-registered user at a merchant website by use of the code scanner 106. Upon being registered with the merchant website, the non-registered user becomes a registered user. In use, the user (for example, a would-be purchaser of goods or services) uses a web browser on the internet-enabled device 116, such as a desktop computer, laptop computer or tablet, to browse a merchant website that has been configured for QR-based registration, login or checkout as described above. The user browses the website for goods or services offered by the merchant and can select items to purchase by adding these items to a virtual shopping cart associated with the website. If the user is a first-time visitor to the merchant website, for example, a non-registered user, it may be necessary for the user to register on the website prior to completing the purchase. The phrase "an internet-enabled device connected to an internet" is used to refer to an internet-enabled device that is configured to connect to the internet wirelessly (for example, using an air interface), via a wire connection (for example, a coaxial cable or an Ethernet cable), or via some other manner.

Figure 5:
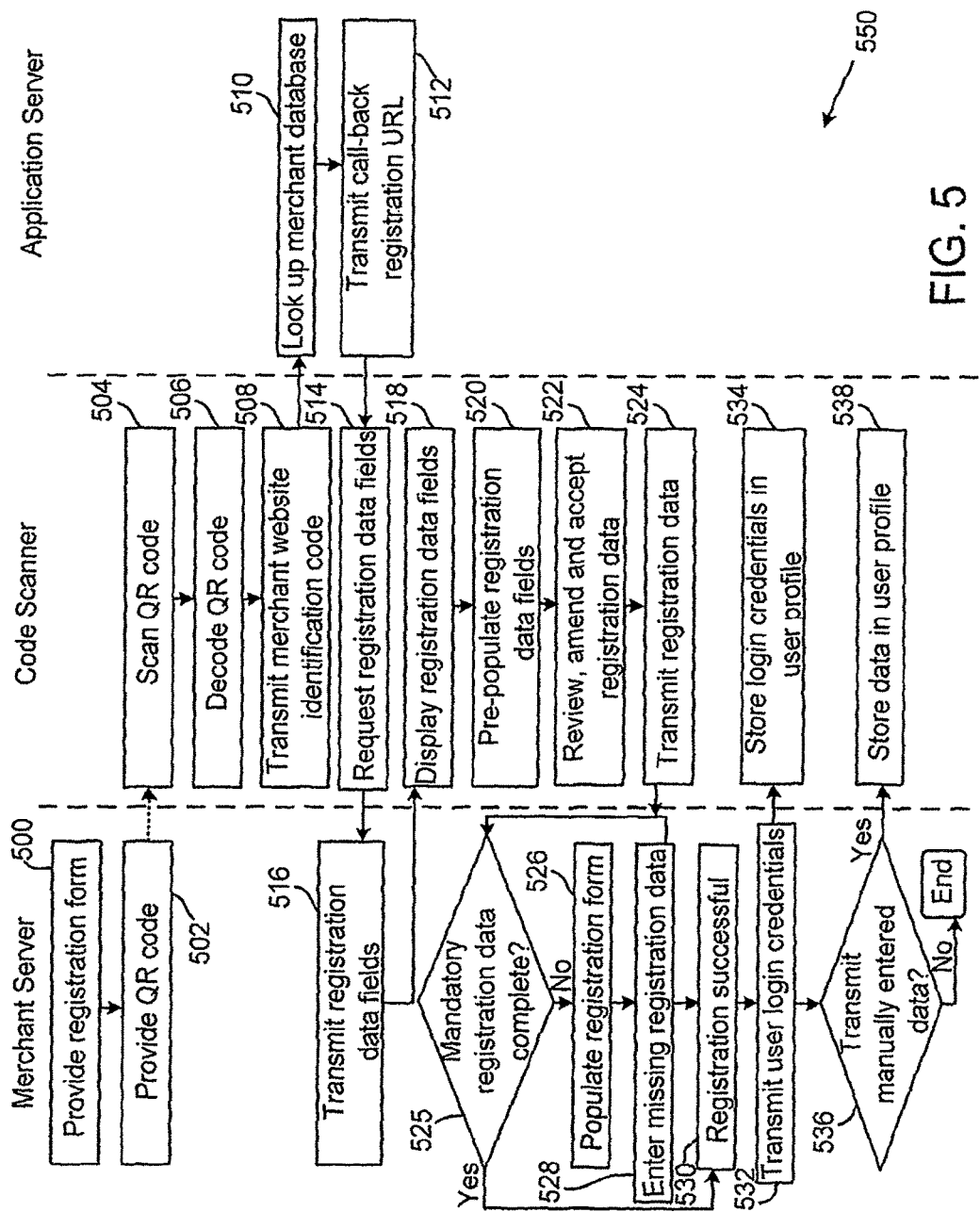
FIG. 5 is a flow chart of functions to carry out registering a user at a merchant website in accordance with a first embodiment of the system of FIG. 1.

FIG. 5 is a flow chart depicting a set of functions 550 that can be carried out in accordance with an example embodiment. The set of functions 550 can be performed to register the user at a merchant website. Registering the user at the merchant website can be referred to as registering the user at the merchant server or registering the user with the merchant. The set of functions 550 are shown within blocks 500 through 538. A description of those blocks now follows.

At block 500, the merchant server 104 provides a registration form of a merchant website. The registration form can be provided to the internet-enabled device 116 via the communication network 108. The internet-enabled device 116 can display a registration webpage including, for example, the registration form displaying the user attributes (for example, data fields) the merchant uses to register the user. Some of the data fields of the registration form can be mandatory for registering the user and some of the data fields of the registration form can be optional for registering the user. As an example, the data fields for the user's first or last names may be mandatory data fields. As another example, the data fields for a selected username and password may be mandatory data fields. Alternatively, the data fields for the selected username and password may be optional such that the merchant server 104 assigns the user a username and password for storage in a user profile 110. The user can, of course, fill in the data fields manually at the internet-enabled device 116 in order to register on the merchant website.

At block 502, the merchant server 104 provides a registration QR code. A unique identification code that was assigned to the merchant website by the application server 102 and a globally unique identifier ('GUID') assigned by the merchant server 104 and that operates as a session identifier are encoded in the registration QR code. The registration QR code can be generated by the merchant server 104 or can be served to the merchant server 104 by a separate source of QR codes (not shown). The registration QR code and registration form can be provided, individually or in combination, to the internet-enabled device 116, which subsequently displays the registration form and the registration QR code. The registration QR code and registration form can be provided to the internet-enabled device 116 as part of a registration webpage the internet-enabled device 116 can display.

At block 504, the user can use the scanner app 164 and the scanner 156 to scan the registration QR code on the registration webpage of the merchant website. At block 506, the scanner app 164 decodes the scanned registration QR code to recover the encoded data that it contains namely, the merchant website identification code and the session GUID. A GUID encoded in a QR code can be transmitted to the merchant server 104, in communications from the code scanner 106, so that the merchant server 104 can determine which internet-enabled device to send data for updating a webpage or display at the internet-enabled device.

At block 508, the code scanner 106 or the scanner app 164 transmits the merchant website identification code to the application server 102 and requests the call-back registration URL 222 of the merchant website. At block 510, the application server 102 uses the merchant website identification code to perform a lookup in the merchant profile in the merchant database 112. At block 512, the application server 102 transmits the call-back registration URL 222 of the merchant website to the code scanner 106. The code scanner 106 provides the call-back registration URL to the scanner app 164 for further processing.

At block 514, the scanner app 164 then requests, from the merchant server 104, particulars of the registration data fields shown on the registration form provided to the internet-enabled device 116. The code scanner 106 transmits that request to the call-back registration URL of the merchant server 104. The code scanner 106 can transmit the session GUID to the merchant server 104 with or separately from the request for registration data fields.

At block 516, the merchant server 104 transmits, to the code scanner 106, a list of the registration data fields. Each registration data field can be flagged as being either mandatory or optional. The merchant server 104 can select the list of registration data fields based on the session GUID received from the code scanner at block 514. The code scanner 106 provides the list of the registration data fields to the scanner app 164. At block 518, the scanner app 164 displays the registration data fields on the user interface 154, indicating which data fields, if any, are mandatory. At block 520, the scanner app 164 pre-populates, as far as possible, the displayed data fields with data stored in the user profile 110.

At block 522, the user can review the pre-populated registration data fields and amend the displayed data, if necessary, and complete any data fields which are unpopulated. After reviewing and amending the data displayed in the registration data fields, the user can accept the displayed data. At block 524, the scanner app 164 causes the code scanner 106 to transmit the displayed registration data to the call-back registration URL 222 of the merchant website on the merchant server 104 in addition to the session GUID recovered from the scanned registration QR code. The code scanner 106 can transmit the session GUID to the merchant server 104 with or separately from the displayed registration data. After receiving the registration data from the code scanner 106, the merchant server 104 can provide the received registration data to the Internet-enabled device 116 to update the registration webpage being displayed at the internet-enabled device 116. The registration webpage can be configured to request (for example, periodically) received registration data from the call-back registration URL 222 of the merchant server 104. Additionally or alternatively, call-back registration URL of the merchant server 104 can be configured to forward the received registration data to the internet-enabled device 116 for updating the displayed registration webpage.

At block 525, the merchant server 104 can determine whether the mandatory registration data for registering the user with the merchant server 104 has been received for the user.

If all of the mandatory registration data has been received by the merchant server 104, the merchant server 104 can make a determination that registration of the user was successfully completed and proceed to block 530. At block 530, the registration page of the merchant website updates to indicate to the user that registration on the merchant website has completed successfully.

If the merchant server 104 determines that it needs at least a portion of the mandatory registration data to register the user, the merchant server 104 can proceed to block 526, where the registration page of the merchant website will refresh and populate those mandatory registration fields for which data was received from the scanner app. At block 528, the merchant server 104 can request the user to manually fill in the remaining registration fields on the website registration page.

At block 532, upon or after successfully completing registration on the merchant website, the merchant website authorises the newly-registered user's website login credentials, namely, the user's username and password and can return these credentials to the scanner app 164. At block 534, the code scanner can store the user's login credentials into the user profile 110 for subsequent use on the particular merchant website.

At block 536, the merchant server 104 can, optionally, return to the scanner app 164 any data that the user inputs manually to fill in any unpopulated website registration fields.

At block 538, the code scanner 106 stores the manually entered data, returned from the merchant server 104, into the user profile 110. The scanner app 164 can cause the code scanner 106 to store that data, which will be available for subsequent use. For example, suppose two of the website registration fields on the merchant website are a security question and a corresponding answer and, suppose further, that the user profile 110 does not include a stored security question and answer. As described, the user can manually fill in the security question and answer fields in the scanner app 164 or on the registration webpage of the merchant website. If the user fills in the two fields in the scanner app, the scanner app 164 updates the user profile 110 to include these additional two data items. If, on the other hand, the user fills in the question and answer fields on the registration webpage of the merchant website, the merchant server 104 transmits the two data items to the scanner app 164, which updates the user profile 110. In either case, the security question and corresponding answer will be available automatically to pre-populate these fields in any subsequent website registration where these data items can be entered into data fields, regardless of whether the data fields are optional or mandatory data fields.

B. QR-Based Login

Figure 6:
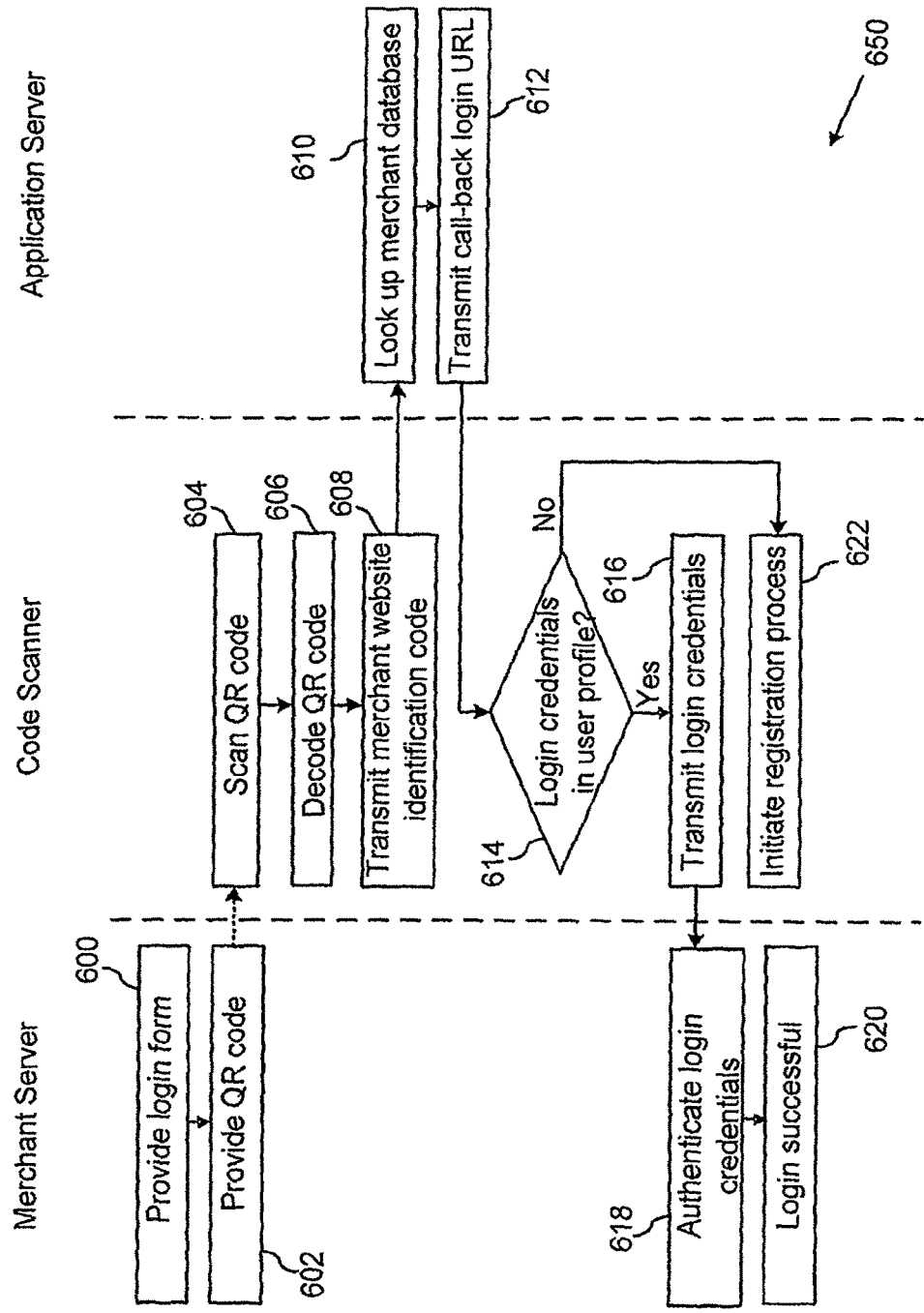
FIG. 6 is a flow chart of functions to carry out logging on to a merchant website in accordance with the first embodiment of the system of FIG. 1.

If the user is not a first-time visitor to the merchant website and has previously registered with the merchant website, the user can logon to the merchant website in order to make a purchase. FIG. 6 is a flow chart depicting a set of functions 650 that can be carried out in accordance with an example embodiment. The set of functions 650 can be performed in order for the user to logon to the merchant website. As shown in FIG. 6, the set of functions 650 pertain to logging on to a merchant website and the user accessing, or being directed to, the login page of the merchant website by a web browser on the internet-enabled device 116. The set of functions 650 are shown within blocks 600 through 622. A description of those blocks now follows.

At block 600, the merchant server 104 provides a login page of merchant website. The login page can be provided to the internet-enabled device 116 via the communication network 108. The internet-enabled device 116 can display the login page including, for example, a login form displaying the user attributes (i.e. data fields) the merchant uses to login the user. Some of these data fields, such as the user's username, and password, can be mandatory. Other data fields can be optional. The user can, of course, fill in the data fields manually in order to login to the merchant website.

At block 602, the merchant server 104 provides a login QR code that encodes the identification code that was assigned to the merchant website by the application server 102 and a GUID that operates as a session identifier. The login QR code can be generated by the merchant server 104 or can be served to the merchant server 104 by a separate source of QR codes (not shown). The login QR code and login form can be provided, individually or in combination, to the internet-enabled device 116, which subsequently displays the login form and the login QR code. The login QR code and login form can be provided to the internet-enabled device 116 as part of a login webpage the internet-enabled device 116 can display.

At block 604, the user can use the scanner app 164 and the scanner 156 to scan the login QR code on the login page of the merchant website. At block 606, the scanner app 164 decodes the scanned login QR code to recover the encoded data that it contains, namely, the merchant website identification code and the session GUID.

At block 608, the code scanner 106 or the scanner app 164 transmits the merchant website identification code to the application server 102 and requests the call-back login URL 224 of the merchant website. At block 610, the application server 102 uses the merchant website identification code to perform a lookup in the merchant profile in the merchant database 112. At block 612, the application server 102 transmits the call-back login URL 224 of the merchant website to the code scanner 106. The code scanner 106 provides the call-back login URL 224 to the scanner app 164 for further processing.

At block 614, the scanner app 164 performs a lookup in the user profile 110 to check whether the profile contains login credentials associated with the login webpage of the merchant website that the user is seeking to logon to. If such login credentials are found in the user profile 110, the credentials, together with the session GUID, are transmitted (at block 616) to the call-back login URL of the merchant website for authentication. If the merchant server 104 successfully authenticates the transferred login credentials at block 618, the login webpage of the merchant website updates to indicate to the user that login to the merchant website has completed successfully (block 620). As an example, after authenticating the login credentials received from the code scanner 106, the merchant server 104 can provide data to the internet-enabled device 116 to update the login webpage to indicate user login was successful. The login webpage can be configured to request (for example, periodically) status of authenticating the user's login credentials. Updating the login webpage can include providing the user with access to a shopping webpage via the merchant website.

Returning to block 614, if, on the other hand, the user profile 110 does not contain login credentials associated with the login page of the merchant website, the scanner app 164 initiates, at block 622, a website registration process as if the user had scanned a registration QR code on the registration page of the merchant website, as described above.

C. QR-Based Purchasing

Figure 7:
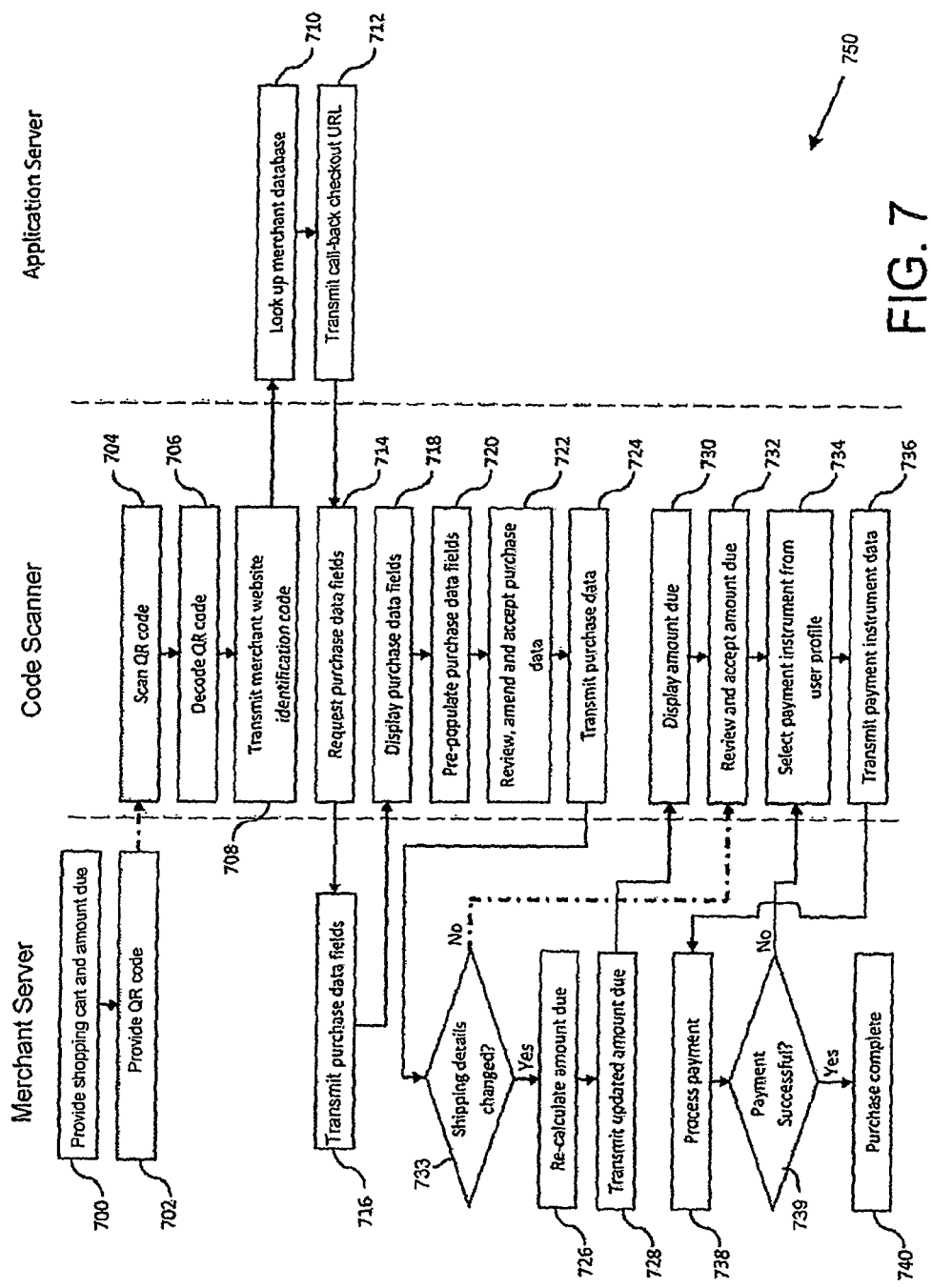
FIG. 7 is a flow chart of functions to carry out a purchase transaction from a merchant website in accordance with the first embodiment of the system of FIG. 1.

FIG. 7 is a flow chart depicting a set of functions 750 that can be carried out in accordance with an example embodiment. The set of functions 750 can be performed to complete a purchase transaction of goods or services, contained in a virtual shopping cart, that the user wishes to acquire from the merchant or merchant website. The user can navigate to a checkout webpage of the merchant website by means of a web browser on the internet-enabled device 116. The set of functions 750 are shown within blocks 700 through 740. A description of those blocks now follows.

At block 700, the merchant server 104 provides a virtual shopping cart and an amount due. As an example, the shopping cart and the amount due can be provided to the internet-enabled device 116 via the checkout webpage that displays the contents of the shopping cart as well as the total amount due and payable for the purchase. The merchant server 104 can provide purchase data fields for manually completing the purchase of items in the shopping cart using the internet-enabled device 116.

At block 702, the merchant server 104 provides a checkout QR code. A unique identification code that was assigned to the merchant website by the application server 102 and a GUID that operates as a session identifier are encoded within the checkout QR code. The checkout QR code can be generated by the merchant server 104 or can be served to the merchant server 104 by a separate source of QR codes (not shown). The checkout QR code can be provided to the internet-enabled device 116, which subsequently displays the checkout QR code for scanning by the code scanner 106. The checkout QR code can be provided to the internet-enabled device 116 as part of a checkout webpage displayable using the internet-enabled device 116.

At block 704, the user can use the scanner 156 or the scanner app 164 to scan the checkout QR code on the checkout webpage of the merchant website. At block 706, the scanner app 164 decodes the scanned checkout QR code to recover the encoded data that it contains, namely, the merchant website identification code and the session GUID.

At block 708, the code scanner 106 or the scanner app 164 transmits the merchant website identification code to the application server 102 and requests the call-back checkout URL 226 of the merchant website. At block 710, the application server 102 uses the merchant website identification code to perform a lookup in the merchant profile in the merchant database 112. At block 712, the application server 102 transmits the call-back checkout URL 226 of the merchant website to the code scanner 106. The code scanner 106 provides the call-back checkout URL to the scanner app 164 for further processing.

At block 714, the scanner app 164 requests particulars of the required purchase-data fields from the call-back checkout URL 226 of the merchant website. The code scanner 106 can transmit the session GUID to the merchant server 104 with or separately from the request for particulars of the required purchase-data fields. At block 716, the merchant server 104 transmits a list of the required website purchase-data fields to the scanner app 164, which typically include a shipping address, a shipping method, an amount due, and details of a payment instrument to be used (for example, a credit or debit card number, a card expiry date, a cardholder's name, a card verification code (CVC), or a personal identification number (PIN). The shipping method data field is accompanied by a choice of shipping methods offered by the merchant and the amount due data field is accompanied by the amount due and payable as displayed on the checkout page of the merchant website.

At block 718, the scanner app 164 displays the website purchase-data fields on the user interface 154. At block 720, the scanner app 164 pre-populates as far as possible, the displayed data fields with data stored in the user profile 110. In particular, the default shipping address that the scanner app 164 uses to pre-populate the shipping address data field can be the user's physical address that is stored in the user profile 110. The user can then review the pre-populated data fields and amend the displayed data if necessary and complete any data fields which are unpopulated. For example, if the user profile 110 contains more than one physical address, the user can select a different shipping address from a drop-down list the scanner app 164 displays on the user interface 154, and can select a shipping method from a further drop-down list.

At block 722, after reviewing and amending the displayed shipping information, if necessary, or any other populated purchase-data fields, the user can accept the displayed data. At block 724, the scanner app 164 transmits the purchase-data, including the shipping information, entered into the purchase-data fields, together with the session GUID, to the call-back checkout URL 226 of the merchant website on the merchant server 104. The code scanner 106 can transmit the session GUID to the merchant server 104 with or separately from the purchase-data. At block 725, the merchant server 104 can determine whether the shipping details have changed. If the merchant server 104 detects that the shipping address or the shipping method has changed, the merchant server 104 can, if appropriate, update the purchase amount displayed on the checkout webpage of the merchant website (block 726) and the updated purchase amount is transmitted back to the code scanner 106 (block 728) for display by the scanner app 164 (block 730). If the merchant server 104 detects that the shipping details have not changed, the process can continue at block 732.

At block 732, the user can review the purchase amount and accept the amount for payment. The scanner app 164 then transmits, at block 736, the details of a payment instrument to be used for payment (for example, a credit or debit card number, a cardholder's name, a card expiry date, a CVC, or a PIN, as stored in the user profile 110) and the session GUID to the call-back checkout URL 226 of the merchant website. The code scanner 106 can transmit the session GUID to the merchant server 104 with or separately from the payment instrument data. If the user profile 110 in the code scanner 106 contains details of more than one payment instrument, the user can be prompted to select a preferred payment instrument from a drop-down list displayed by the scanner app 164 (block 734).

Once the details of the selected payment instrument have been received at the call-back checkout URL, the merchant server 104 sends the particulars of the financial transaction (for example, the purchase amount, merchant and payment details) to a payment processor (not shown) for processing (at block 738). At block 739, the merchant server 104 (for example, the payment processor) can determine whether the payment was successful. The payment processor transmits a payment status indicator, for example either successful or unsuccessful. If the payment status is successful, the checkout webpage of the merchant website refreshes to indicate that the user's purchase has completed successfully (block 740). If, on the other hand, the merchant server 104 determines that the payment status is unsuccessful, the checkout webpage refreshes to request the user to select a different payment instrument and re-attempt payment (block 734). Re-attempting payment can occur using the scanner app 164 or the inter-net-enabled device 116.

If the merchant website requires the user to login before completing the purchase transaction, the user can be re-directed to the website login page. The user can login to the merchant website by scanning the login QR code displayed on the login page as described above. If the user profile 110 does not contain login credentials associated with the identification code of the merchant website, the scanner app 164 can initiate a website registration process as if the user had scanned a registration QR code on the registration page of the merchant website, as described above.

D. Additional Example Operation

Figure 8:
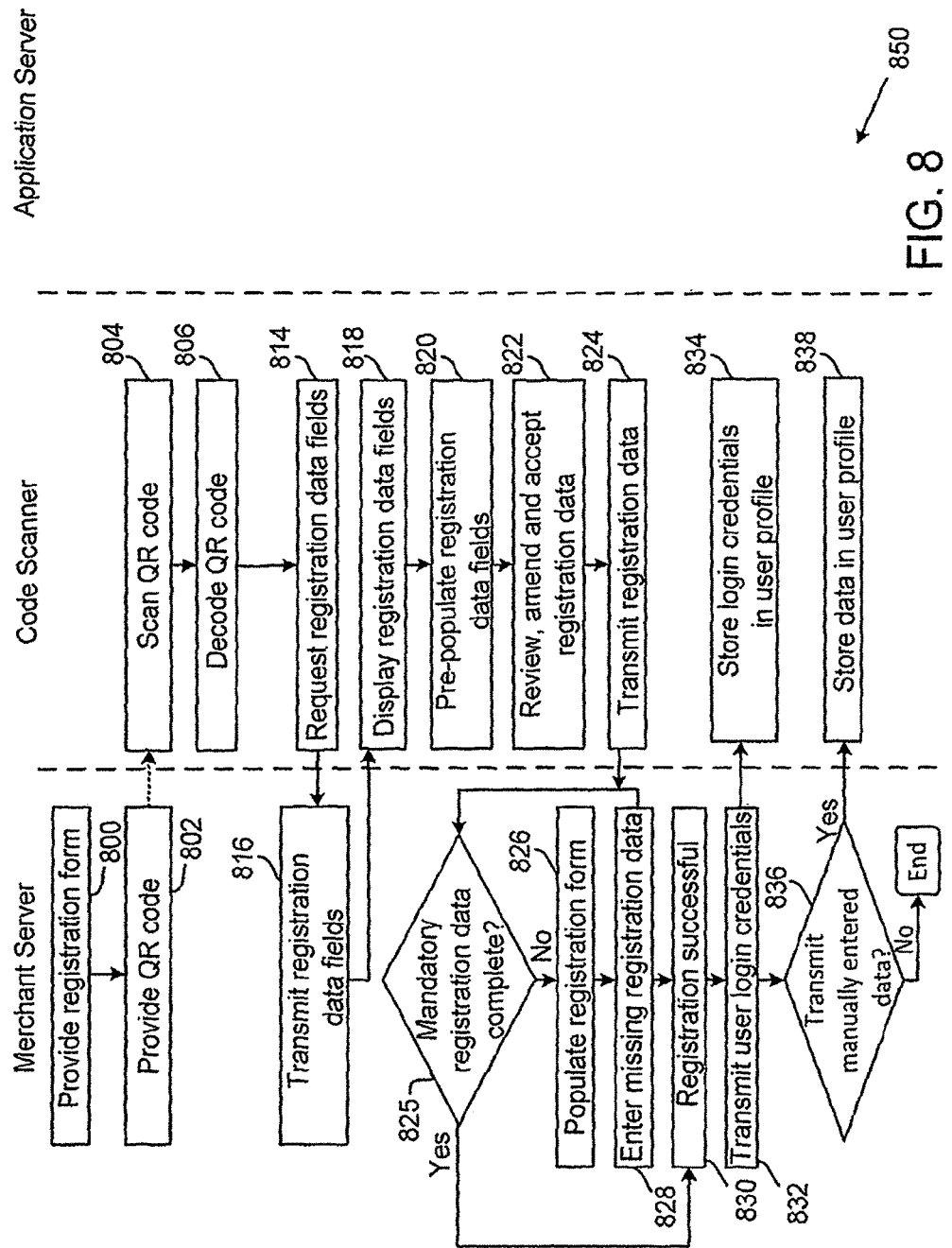
FIG. 8 is a is a flow chart of functions to carry out registering at a merchant website in accordance with a second embodiment of the system of FIG. 1.
Figure 9:
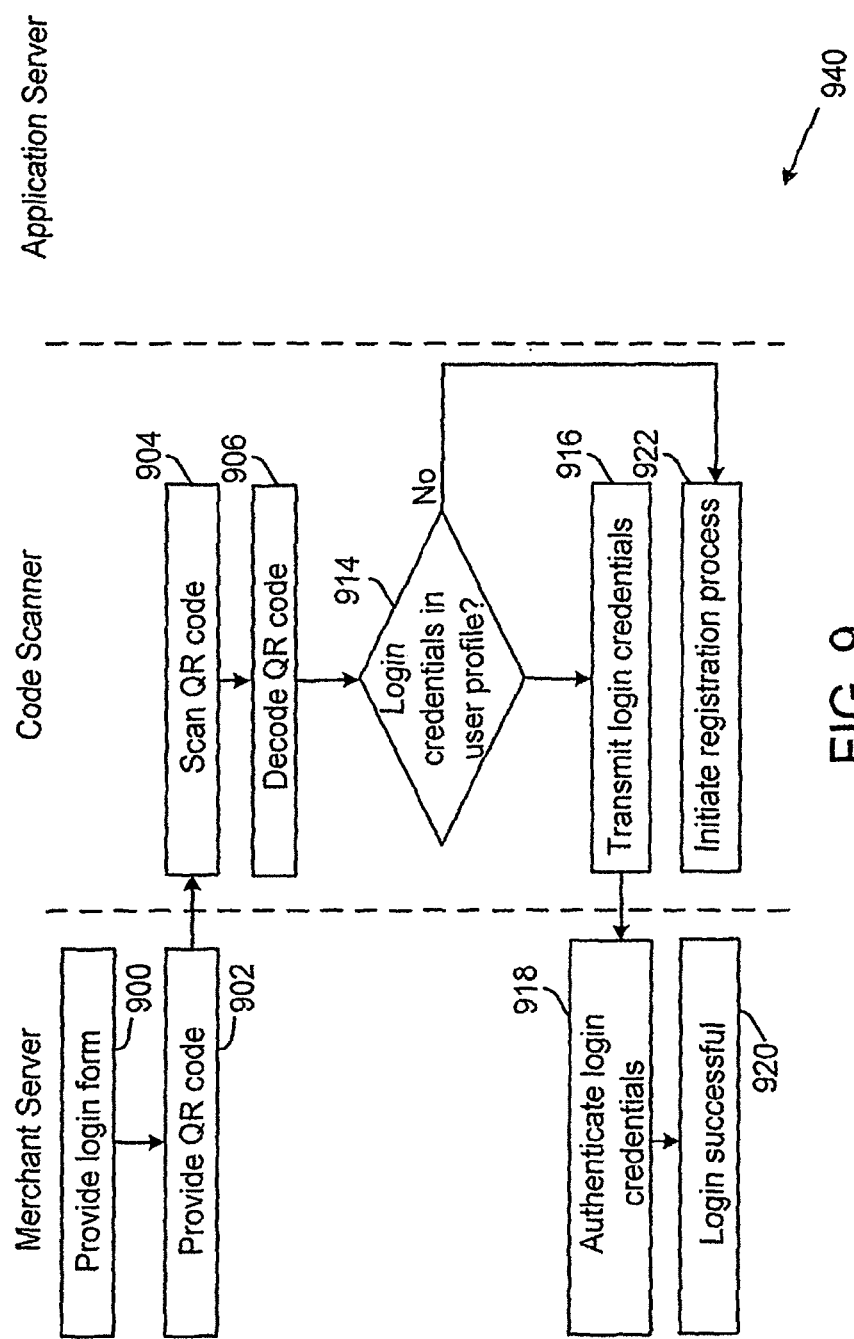
FIG. 9 is a flow chart of functions to carry out logging on to a merchant website in accordance with the second embodiment of the system of FIG. 1.
Figure 10:
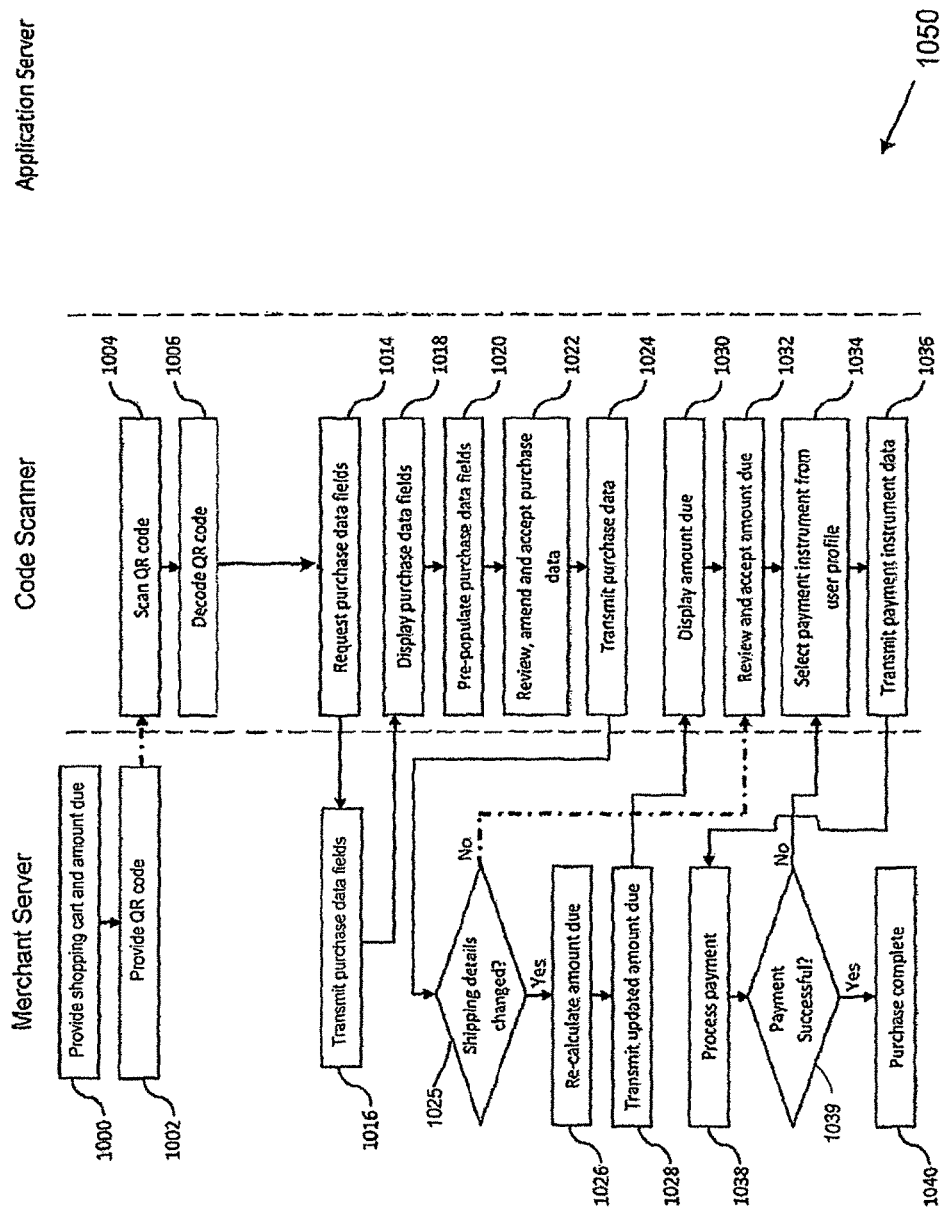
FIG. 10 is a flow chart of functions to carry out a purchase transaction from a merchant website in accordance with the second embodiment of the system of FIG. 1.

FIGS. 8, 9, and 10 are flow charts that depict sets of functions that can be carried out in accordance with an alternative embodiment in which the registration, login and checkout QR codes displayed on the registration, login and checkout webpages of the merchant server 104, respectively, encode the call-back URL of the respective webpage of the merchant server 104, together with the merchant website identification code and a session GUID issued by the merchant server 104.

FIG. 8 is a flow chart depicting a set of functions 850 that can be performed to register the user at a merchant website. The set of functions 850 are shown within blocks 800 through 806 and 814 through 838. A description of those blocks now follows.

At block 800, the merchant server 104 provides a registration form of a merchant website. The registration form can be provided to the internet-enabled device 116 via the communication network 108. The internet-enabled device 116 can display a registration webpage including, for example, the registration form displaying the user attributes (for example, data fields) the merchant uses to register the user. Some of the data fields of the registration form can be mandatory for registering the user and some of the data fields of the registration form can be optional for registering the user. As an example, the data fields for the user's first or last names can be mandatory data fields. As another example, the data fields for a selected username and password can be mandatory data fields. Alternatively, the data fields for the selected username and password can be optional such that the merchant server 104 assigns the user a username and password for storage in the user profile 110. The user can, of course, fill in the data fields manually at the internet-enabled device 116 in order to register on the merchant website.

At block 802, the merchant server 104 provides a registration QR code. A unique identification code that was assigned to the merchant website by the application server 102, a GUID assigned by the merchant server 104 and that operates as a session identifier, and a call-back registration URL are encoded in the registration QR code. The registration QR code can be generated by the merchant server 104 or can be served to the merchant server 104 by a separate source of QR codes (not shown). The registration QR code and registration form can be provided, individually or in combination, to the internet-enabled device 116, which subsequently displays the registration form and the registration QR code. The registration QR code and registration form can be provided to the internet-enabled device 116 as part of a registration webpage the internet-enabled device 116 can display.

At block 804, the user can use the scanner app 164 and the scanner 156 to scan the registration QR code on the registration webpage of the merchant website. At block 806, the scanner app 164 decodes the scanned registration QR code to recover the encoded data that it contains namely, the merchant website identification code, the session GUID, and the call-back registration URL.

At block 814, the scanner app 164 then requests, from the merchant server 104, particulars of the registration data fields shown on the registration form provided to the internet-enabled device 116. The code scanner 106 transmits that request to the call-back registration URL of the merchant server 104. The code scanner 106 can transmit the session GUID to the merchant server 104 with or separately from the request for registration data fields.

At block 816, the merchant server 104 transmits, to the code scanner 106, a list of the registration data fields. Each registration data field can be flagged as being either mandatory or optional. The code scanner 106 provides the list of the registration data fields to the scanner app 164. At block 818, the scanner app 164 displays the registration data fields on the user interface 154, indicating which data fields, if any, are mandatory. At block 820, the scanner app 164 pre-populates, as far as possible, the displayed data fields with data stored in the user profile 110.

At block 822, the user can review the pre-populated registration data fields and amend the displayed data, if necessary, and complete any data fields which are unpopulated. After reviewing and amending the data displayed in the registration data fields the user can accept the displayed data. At block 824, the scanner app 164 causes the code scanner 106 to transfer the displayed registration data to the call-back registration URL of the merchant website on the merchant server 104. The code scanner 106 can transmit the session GUID to the merchant server 104 with or separately from the displayed registration data. After receiving the registration data from the code scanner 106, the merchant server 104 can provide the received registration data to the internet-enabled device 116 to update the registration webpage being displayed at the internet-enabled device 116. The registration webpage can be configured to request (for example, periodically) received registration data from the call-back registration URL of the merchant website. Additionally or alternatively, the call-back registration URL of the merchant website can be configured to forward the received registration data to the internet-enabled device 116 for updating the displayed registration webpage.

At block 825, the merchant server 104 can determine whether the mandatory registration data for registering the user with the merchant server 104 has been received for the user.

If all of the mandatory registration data has been received by the merchant server 104, the merchant server 104 can make a determination that registration of the user was successfully completed and proceed to block 830. At block 830, the registration page of the merchant website updates to indicate to the user that registration on the merchant website has completed successfully.

If the merchant server 104 determines that it needs at least a portion of the mandatory registration data to register the user, the merchant server 104 can proceed to block 826, where the registration page of the merchant website will refresh and populate those mandatory registration fields for which data was received from the scanner app. At block 828, the merchant server 104 can request the user to manually fill in the remaining registration fields on the website registration page.

At block 832, upon or after successfully completing registration on the merchant website, the merchant website authorises the newly-registered user's website login credentials, namely, the user's username and password and can return these credentials to the scanner app 164. At block 834, the code scanner can store the user's login credentials into the user profile 110 for subsequent use on the particular merchant website.

At block 836, the merchant server 104 can, optionally, return to the scanner app 164 any data that the user inputs manually to fill in any unpopulated website registration fields.

At block 838, the code scanner 106 stores the manually entered data, returned from the merchant server 104, into the user profile 110. The scanner app 164 can cause the code scanner 106 to store that data, which will be available for subsequent use. For example, suppose two of the website registration fields on the merchant website are a security question and a corresponding answer and, suppose further, that the user profile 110 does not include a stored security question and answer. As described, the user can manually fill in the security question and answer fields in the scanner app 164 or on the registration webpage of the merchant website. If the user fills in the two fields in the scanner app, the scanner app 164 updates the user profile 110 to include these additional two data items. If, on the other hand, the user fills in the question and answer fields on the registration webpage of the merchant website, the merchant server 104 transmits the two data items to the scanner app 164, which updates the user profile 110. In either case, the security question and corresponding answer will be available automatically to pre-populate these fields in any subsequent website registration where these data items can be entered into data fields, regardless of whether the data fields are optional or mandatory data fields.

Turning now to FIG. 9, if the user is not a first-time visitor to the merchant website and has previously registered with the merchant website, the user can logon to the merchant website in order to make a purchase. FIG. 9 is a flow chart depicting a set of functions 940 that can be carried out in accordance with an example embodiment. The set of functions 940 can be performed in order for the user to logon to the merchant website. As shown in FIG. 9, the set of functions 940 pertain to logging onto a merchant website and the user accessing, or being directed to, the login page of the merchant website by a web browser on the Internet-enabled device 116. The set of functions 940 are shown within blocks 900 through 906 and 914 through 922. A description of those blocks now follows.

At block 900, the merchant server 104 provides a login page of merchant website. The login page can be provided to the internet-enabled device 116 via the communication network 108. The internet-enabled device 116 can display the login page including, for example, a login form displaying the user attributes (i.e. data fields) the merchant uses to login the user. Some of these data fields, such as the user's username, and password, can be mandatory. Other data fields can be optional. The user can, of course, fill in the data fields manually in order to login to the merchant website.

At block 902, the merchant server 104 provides a login QR code that encodes the unique identification code that was assigned to the merchant website by the application server 102, a GUID that operates as a session identifier, and call-back login URL for the merchant website. The login QR code can be generated by the merchant server 104 or can be served to the merchant server 104 by a separate source of QR codes (not shown). The login QR code and login form can be provided, individually or in combination, to the internet-enabled device 116, which subsequently displays the login form and the login QR code. The login QR code and login form can be provided to the internet-enabled device 116 as part of a login webpage the internet-enabled device 116 can display.

At block 904, the user can use the scanner app 164 and the scanner 156 to scan the login QR code on the login page of the merchant website. At block 906, the scanner app 164 decodes the scanned login QR code to recover the encoded data that it contains, namely, the merchant website identification code, the session GUID, and the call-back login URL of the merchant website.

At block 914, the scanner app 164 performs a lookup in the user profile 110 to check whether the profile contains login credentials associated with the login webpage of the merchant website that the user is seeking to logon to. If such login credentials are found in the user profile 110, the credentials, together with the session GUID, are transmitted (at block 916) to the call-back login URL of the merchant website for authentication. If the merchant server 104 successfully authenticates the transferred login credentials at block 918, the login webpage of the merchant website updates to indicate to the user that login to the merchant website has completed successfully (block 920). As an example, after authenticating the login credentials received from the code scanner 106, the merchant server 104 can provide data to the internet-enabled device 116 to update the login webpage to indicate user login was successful. The login webpage can be configured to request (for example, periodically) status of authenticating the user's login credentials. Updating the login webpage can include providing the user with access to a shopping webpage via the merchant website.

Returning to block 914, if, on the other hand, the user profile 110 does not contain login credentials associated with the login page of the merchant website, the scanner app 164 initiates, at block 922, a website registration process as if the user had scanned a registration QR code on the registration page of the merchant website, as described above.

As represented in FIG. 10, in order to complete a purchase transaction of goods or services in a virtual shopping cart, the user navigates to the checkout webpage of the merchant website by means of a web browser on an internet-enabled device 116. FIG. 10 is a flow chart depicting a set of functions 1050 that can be carried out in accordance with an example embodiment. The set of functions 1050 can be performed to complete a purchase transaction of goods or services, contained in a virtual shopping cart, that the user wishes to acquire from the merchant or merchant website. The user can navigate to a checkout webpage of the merchant website by means of a web browser on the internet-enabled device 116. The set of functions 1050 are shown within blocks 1000 through 1006 and 1014 through 1040. A description of those blocks now follows.

At block 1000, the merchant server 104 provides a virtual shopping cart and an amount due. As an example, the shopping cart and the amount due can be provided to the internet-enabled device 116 via the checkout webpage that displays the contents of the shopping cart as well as the total amount due and payable for the purchase. The merchant server 104 can provide purchase data fields for manually completing the purchase of items in the shopping cart using the internet-enabled device 116.

At block 1002, the merchant server 104 provides a checkout QR code. A unique identification code that was assigned to the merchant website by the application server 102, a GUID that operates as a session identifier, and a call-back checkout URL of the merchant server 104 are encoded within the checkout QR code. The checkout QR code can be generated by the merchant server 104 or can be served to the merchant server 104 by a separate source of QR codes (not shown). The checkout QR code can be provided to the internet-enabled device 116, which subsequently displays the checkout QR code for scanning by the code scanner 106. The checkout QR code can be provided to the internet-enabled device 116 as part of a checkout webpage displayable using the internet-enabled device 116.

At block 1004, the user can use the scanner 156 or the scanner app 164 to scan the checkout QR code on the checkout webpage of the merchant website. At block 1006, the scanner app 164 decodes the scanned checkout QR code to recover the encoded data that it contains, namely, the merchant website identification code, the session GUID, and the call-back checkout URL.

At block 1014, the scanner app 164 requests particulars of the required purchase-data fields from the call-back checkout URL of the merchant website. The code scanner 106 can transmit the session GUID to the merchant server 104 with or separately from the request for particulars of the required purchase-data fields. At block 1016, the merchant server 104 transmits a list of the required website purchase-data fields to the scanner app 164, which typically include a shipping address, a shipping method and details of a payment instrument to be used (for example, a credit or debit card number, a card expiry date, a cardholder's name, a CVC, or a PIN. The shipping method data field is accompanied by a choice of shipping methods offered by the merchant.

At block 1018, the scanner app 164 displays the website purchase-data fields on the user interface 154. At block 1020, the scanner app 164 pre-populates as far as possible, the displayed data fields with data stored in the user profile 110. In particular, the default shipping address that the scanner app 164 uses to pre-populate the shipping address data field can be the user's physical address that is stored in the user profile 110. The user can then review the pre-populated data fields and amend the displayed data if necessary and complete any data fields which are unpopulated. For example, if the user profile 110 contains more than one physical address, the user can select a different shipping address from a drop-down list the scanner app 164 displays on the user interface 154, and can select a shipping method from a further drop-down list.

At block 1022, after reviewing and amending the displayed shipping information, if necessary, or any other populated purchase-data fields, the user can accept the displayed purchase-data. At block 1024, the scanner app 164 transmits the purchase-data, including the shipping information, entered into the purchase-data fields to the call-back checkout URL of the merchant website on the merchant server 104. The code scanner 106 can transmit the session GUID to the merchant server 104 with or separately from the purchase-data. At block 1025, the merchant server 104 can determine whether the shipping details have changed. If the merchant server 104 detects that the shipping address or the shipping method has changed, the merchant server 104 can, if appropriate, update the purchase amount displayed on the checkout webpage of the merchant website (block 1026) and the updated purchase amount is transmitted back to the code scanner 106 (block 1028) for display by the scanner app 164 (block 1030). If the merchant server 104 detects that the shipping details have not changed, the process can continue at block 1032.

At block 1032, the user can review the purchase amount and accept the amount for payment. The scanner app 164 then transmits, at block 1036, the details of a payment instrument to be used for payment (for example, a credit or debit card number, a cardholder's name, a card expiry date, a CVC, or a PIN, as stored in the user profile 110) to the call-back checkout URL of the merchant website. The code scanner 106 can transmit the session GUID to the merchant server 104 with or separately from the payment instrument data. If the user profile 110 in the code scanner 106 contains details of more than one payment instrument, the user can be prompted to select a preferred payment instrument from a drop-down list displayed by the scanner app 164 (block 1034).

Once the details of the selected payment instrument have been received at the call-back checkout URL, the merchant server 104 sends the particulars of the financial transaction (for example, the purchase amount, merchant and payment details) to a payment processor (not shown) for processing (at block 1038). At block 1039, the merchant server 104 (for example, the payment processor) can determine whether the payment was successful. The payment processor transmits a payment status indicator, for example either successful or unsuccessful. If the payment status is successful, the checkout webpage of the merchant website refreshes to indicate that the user's purchase has completed successfully (block 1040). If, on the other hand, the merchant server 104 determines that the payment status is unsuccessful, the checkout webpage refreshes to request the user to select a different payment instrument and re-attempt payment (block 1034). Re-attempting payment can occur using the scanner app 164 or the internet-enabled device 116.

If the merchant website requires the user to login before completing the purchase transaction, the user can be re-directed to the website login page. The user can login to the merchant website by scanning the login QR code displayed on the login page as described above. If the user profile 110 does not contain login credentials associated with the login page of the merchant website, the scanner app 164 can initiate a website registration process as if the user had scanned a registration QR code on the registration page of the merchant website, as described above.

Clearly, numerous variations and permutations are possible to the embodiments without departing from the scope of this disclosure: Some of these variations and permutations are described below.

1. In accordance with one or more of the disclosed embodiments, the scanner app 164 can enable the user to store more than one username in case the default username is already in use on a particular website. Additional usernames can be added when the user profile 110 is set up or as required during registration at a merchant website if the default username is found to be unavailable. The user can then select which username to use from a drop-down list of alternative usernames that are displayed by the scanner app 164.

2. In accordance with one or more of the disclosed embodiments, the scanner app 164 can enable the user to store multiple security questions with corresponding answers in the user profile 110 on the code scanner 106. In such an embodiment, the user can choose and answer to use for website registration purposes from a drop-down list of alternative questions displayed by the scanner app 164.

3. In accordance with one or more of the disclosed embodiments, instead of the user profile 110 being stored only on the code scanner 106, the profile can be replicated and stored on the application server 102 as well. In this embodiment, the scanner app 164 on the code scanner synchronises changes to the user profile 110 with the copy of the profile on the application server 102 as the changes occur, or periodically, or explicitly under user command. The copy of the user profile on the application server 102 can then be imported to a different code scanner, for example when the user changes smartphones or in the event the user loses or damages her code scanner 106.

4. In accordance with one or more of the disclosed embodiments, in order to improve security of the system 100, transmission of data from the user profile 110 to the merchant server 104 by the scanner app 164 can be encrypted. In order to implement this feature, the QR code displayed on the relevant page of the merchant website encodes, in addition to the unique identification code and a session-identifying GUID, an encryption key that is valid for the duration of the user session on the merchant website. The scanner app 164 decodes the scanned QR code to recover the encryption key and uses the key to encrypt data to be transmitted by the scanner app 164 to the merchant website where the received data is decrypted using the same encryption key.

Figure 11:
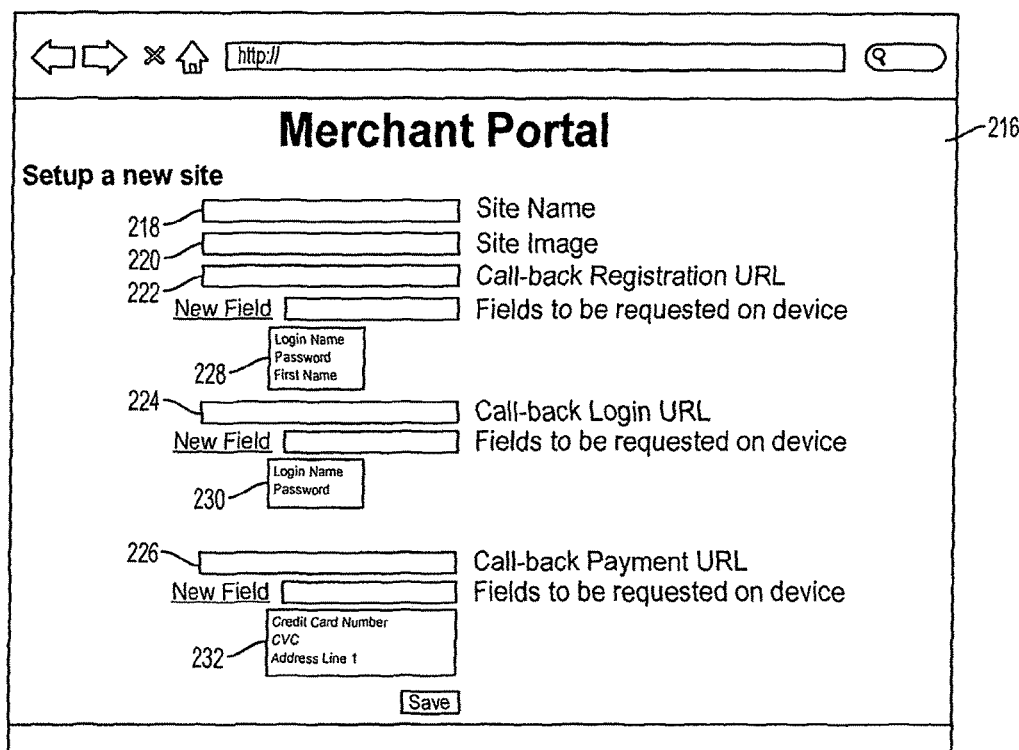
FIG. 11 is an alternative example of the further page of the merchant portal website to that shown in FIG. 4.

5. In accordance with one or more of the disclosed embodiments, the merchant portal website 120 can enable a merchant to configure the merchant profile in the merchant database 112 to include additional information. In particular, FIG. 11 illustrates an alternative embodiment of the merchant portal website page of FIG. 3 in which a merchant can configure the following additional information for each merchant website in the merchant profile: (i) for QR-based registration, a list 228 of registration data fields required by the merchant website and a corresponding flag indicating whether each field is mandatory or optional, (ii) for QR-based login, a list 230 of login data fields required by the merchant website, and (iii) for QR-based purchasing, a list 232 of purchase-data fields required by the merchant website.

This can enable the scanner app 164 to request the lists of registration, login and purchase-data fields directly from the application server 102 instead of requesting the lists from the respective call-back registration, login and checkout URLs of the merchant website. The fields in lists 228, 230, and 232 are provided as examples and may not be required fields.

6. In accordance with one or more of the disclosed embodiments, instead of the code scanner 106 or the scanner app 164 transmitting details of a selected payment instrument to the merchant server 104 for payment processing, the code scanner 106 or the scanner app 164 can send the financial transaction particulars to the application server 102 for processing. The application server 102 can then process the payment and return a payment status indicator, either successful or unsuccessful, to the checkout webpage of the merchant website.

7. In accordance with one or more of the disclosed embodiments, each QR code displayed on the internet-enabled device 116 is unique. The variation between each unique QR code can be a unique session GUID encoded within the QR code. Refreshing a webpage displayed by the internet-enabled device 116, regardless of whether the refreshing is triggered by the merchant server 104 or the internet-enabled device 116, can include refreshing the displayed webpage with another unique QR code.

8. In accordance with one or more of the disclosed embodiments, data sent from the code scanner 106 or the scanner app 164 may be insufficient for registering a user or code scanner, logging in a user or code scanner, or completing a purchase of an item within a virtual shopping cart. Such data may be insufficient because, for example, a payment instrument card number is not correct, an expiration date on the payment instrument card is not correct, all of the data required to register or login a user or code scanner was not provided to the merchant server, or all of the data required to complete purchasing the item was not provided to the merchant server. When insufficient data is received by the merchant server 104, the merchant server 104 can transmit, to the internet-enabled device 116, a displayable notice that indicates registration, login, or completing the purchase was unsuccessful. Such notice may not indicate why the registration, login, or completing the purchase was unsuccessful. Additionally or alternatively, when insufficient data is received by the merchant server 104, the merchant server 104 can transmit, to the code scanner 106, a displayable notice that indicates registration, login, or completing the purchase was unsuccessful and why the registration, login, or completing the purchase was unsuccessful.

9. In accordance with one or more of the disclosed embodiments the user may, after reviewing the contents of the virtual shopping cart and the amount due as displayed on the checkout page of the merchant website, scan the checkout QR code (that encodes the merchant website identification code and the session GUID). The scanner app 164 decodes the scanned checkout QR code and obtains the call-back checkout URL 226 from the application server 102 as previously described. The scanner app 164 then displays a payment form with fields pertaining to a payment instrument to be used for payment (for example, a credit or debit card number, a cardholder's name, a card expiry date, a CVC, or a PIN, as stored in the user profile 110). The fields in the payment form are pre-populated with corresponding data stored in user profile 110. If the user profile contains details of more than one payment instrument, the user can be required to select a preferred payment instrument from a drop-down list displayed by the scanner app 164. The user can accept the displayed payment instrument details, whereupon, the scanner app 164 transmits the payment instrument details to the call-back checkout URL 226 for processing.

10. In accordance with one or more of the disclosed embodiments, the user interface 154 of the code scanner 106 can display a merchant webpage with one of the described QR codes described herein. Using the scanner app 164 or another selector on the code scanner 106, the QR code displayed on the code scanner 106 can be transmitted (for example, downloaded) to the code scanner 106. The code scanner 106 can store the QR code transmitted to the code scanner 106 in the data storage device 158. The scanner app 164 can decode the stored QR code to recover data encoded in the QR code. Details and examples of decoding a QR code are described in other parts of this description. Upon recovering the encoded data, the code scanner 106 or scanner app 164 can process the encoded data. Details and examples of processing data recovered from a QR code are described in other parts of this description.

The use of Quick Response technology (QR codes), as described in the example embodiments, can enable user interactions in connection with website registrations, logins and purchases to be conducted more efficiently than is possible by means of known prior art methods. Once a user has established a user profile 110, the user need only scan, by means of the code scanner 106, a QR code displayed on a merchant website in order to effect registration at, or subsequent login to, the website. The user is spared the tedium of manually completing website registration forms or having to enter login credentials. It is anticipated that the use of QR codes for website registration and login in this manner will reduce the proportion of users who can commence website registration and drop-off without completing the registration process.

When a user registers at a merchant website, login credentials for that particular website are stored in the user profile 110, for use in subsequent logins to the website, thereby avoiding the necessity for the user to memorize the login credentials. Furthermore, the user can use different login credentials for each website at which the user registers, without requiring the user to memorize or record such different credentials, resulting in improved security.

Data in the user profile 110 is stored locally in the code scanner 106. This means that sensitive user data such as particulars of payment instruments like credit or debit cards need not be stored or administered elsewhere such as, for example, the merchant server 104, thereby reducing the possibility of such particulars being misappropriated.

IV. Example Scanner Application Displays

Figure 12:
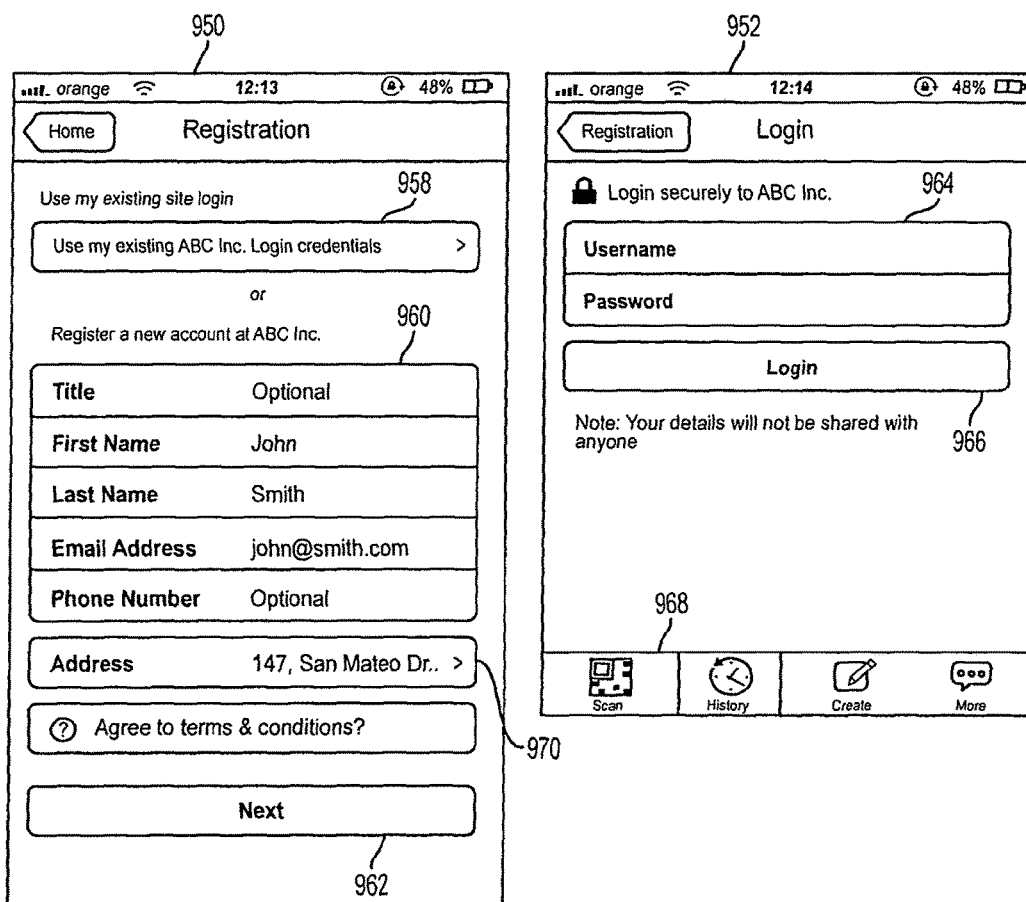
FIG. 12 illustrates example displays provided by a scanner application in accordance with an example embodiment.

Next, FIG. 12 illustrates example scanner app displays 950 and 952 that the scanner app 164 can provide (for example, display) in accordance with one or more of the example embodiments. Scanner app display 950 can be displayed after or in response to the code scanner 106 scanning a registration QR code, such as a registration QR code that is part of a registration webpage displayed on the internet-enabled device 116. The registration webpage can be provided by an example merchant referred to as ABC Inc. Displaying the scanner app display 950, or at least a portion of scanner app display 950, can occur as the scanner app 164 decodes the registration QR code. Additionally or alternatively, displaying the scanner app display 950 can occur after the scanner app 164 decodes the registration QR code.

The scanner app display 950 can include an existing login credential selector 958 for selecting a login credentials previously entered for the registration website and the code scanner 106 or a user of the code scanner 106. If no login credentials have been previously entered for the registration website and the code scanner 106 or the user of the code scanner 106, the existing login credential selector 958 may indicate that no login credential have been entered for the registration website. Alternatively, in such a case, the existing login credential selector 958 could be omitted from the registration scanner app display 950. If, on the other hand, login credentials have been previously entered for the registration website and the code scanner 106 or a user of the code scanner 106, the existing login credential selector 958 can be used to select the previously-entered login credentials. If multiple login credentials have been entered for the registration website, for example, login credentials for two different users of the code scanner 106, the existing login credential selector 958 can be used to initiate selecting or to select from among the multiple login credentials. Upon or after selecting login credentials using the existing login credential selector 958, the server app 164 can transition to displaying scanner app display 952 for logging on to the merchant server 104.

The scanner app display 950, for example, at the existing login credential selector 958 can be pre-populated with data regarding a merchant that provides the registrations website (for example, ABC, Inc.). The merchant data can include an icon or image associated with the merchant.

The scanner app display 950 can include a user-profile entry area 960 that displays registration fields. The user-profile entry area 960 can be included if no login credentials have been previously entered for the registration website and the code scanner 106 or a use of the code scanner 106. One or more of the registration fields, such as "First Name," can be a mandatory field required for registration. One or more of the registration fields, such as "Title" or "Phone Number" can be optional fields that are not required for registration. Such registration field(s) can be labelled as "Optional." One or more of the registration fields can be pre-populated with data stored in code scanner 106, such as data stored in the user profile 110. The scanner app 164 can allow a user to revise the data entered into a registration field. The user-profile entry area 960 can also be included to add additional login credentials, such as login credentials for another user of the code scanner 106.

The scanner app display 950 includes a registration selector 962 that is selectable to cause the registration data entered into the user-profile entry area 960 to be transmitted to a call-back registration URL of the merchant server 104. In one respect, the registration selector 962 can be visible, but unselectable, if no data or improper data has been entered into a or each mandatory registration field. In another respect, the registration selector 962 can be visible and selectable even if no data or improper data has been entered into a or each mandatory registration field. The scanner app 164 can be configured to detect improper data within a field, such as an improper e-mail address.

The scanner app display 952 includes a login data entry area 964 in which a user can enter login credentials, such as a "Username" and "Password." The scanner app 164 can pre-populate login credentials, stored in the user profile 110, into the login data entry area 964. The login credentials pre-populated into the login data entry area 964 can be selected based on the identification code encoded within the registration QR code. If the code scanner 106 includes login credentials for multiple users, a portion of the login credential, such as the user password, may not be populated into the login data entry area 964 when prepopulating login credentials into the login data entry area 964 occurs. In such a case, the user may need to enter the user password prior to logging on to the merchant server.

The scanner app display 952 includes a login selector 966. Selecting login selector 966 (for example, by pressing login selector 966) can cause the scanner app 164 to transmit (block 616 in FIG. 6) the login credentials to the call-back login URL of the merchant server 104.

The scanner app display 952 includes a menu 968 showing other features of scanner app 164 that can be initiated. In accordance with another embodiment, if the code scanner 106 has already stored login credentials to log on to the merchant website, the scanner app display 952 can be displayed automatically upon scanning and decoding the registration QR code.

Figure 13:
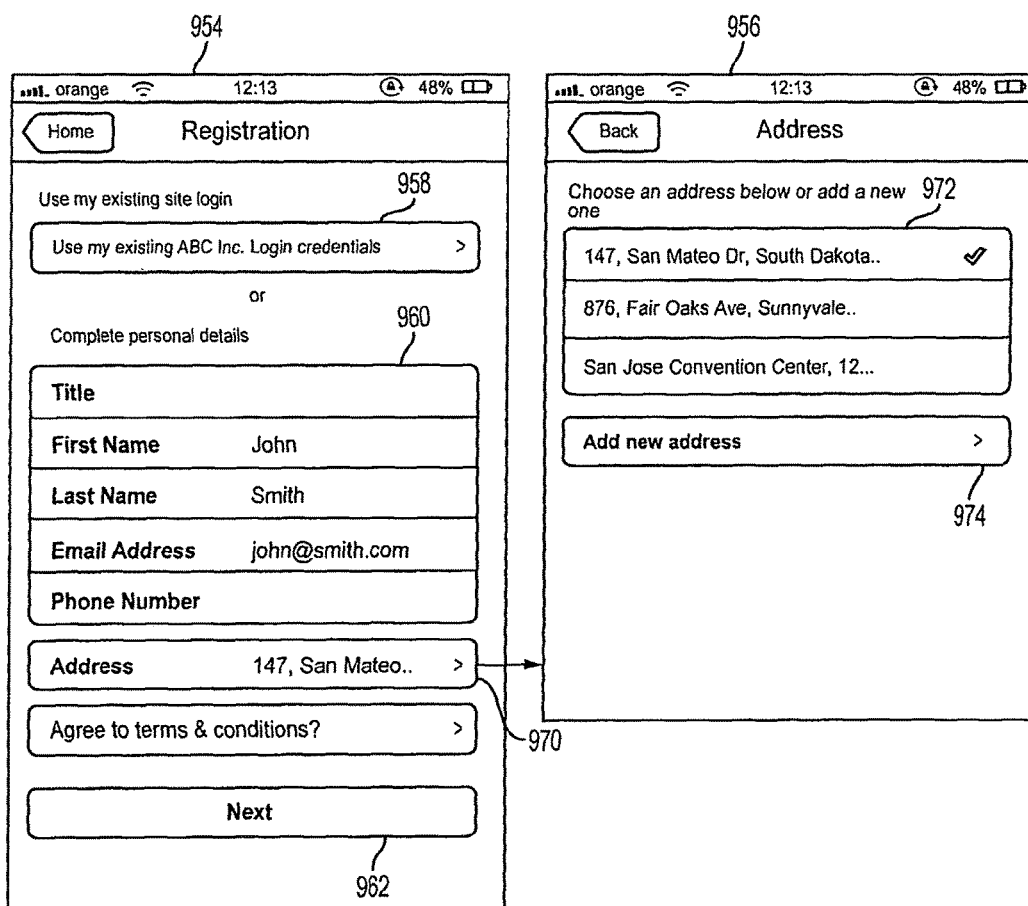
FIG. 13 illustrates additional example displays provided by a scanner application in accordance with an example embodiment.

Next, FIG. 13 illustrates example scanner app displays 954 and 956 that the scanner app 164 can provide (for example, display) in accordance with one or more of the example embodiments. Scanner app display 954 can be displayed after or in response to the code scanner 106 scanning a registration QR code, such as a registration QR code that is part of a registration webpage displayed on the Internet-enabled device 116. The registration webpage can be provided by an example merchant referred to as ABC Inc. Displaying the scanner app display 954, or at least a portion of scanner app display 954, can occur as the scanner app 164 decodes the registration QR code. Additionally or alternatively, displaying the scanner app display 954 can occur after the scanner app 164 decodes the registration QR code. In accordance with this embodiment, the Title and phone Number Registration fields in user-profile entry area 960 are not labelled as "Optional."

The scanner app display 954 includes an address selector 970 that is selectable to cause the scanner app 164 to display the scanner app display 956. The scanner app display 956 includes an address list 972 from which an address is selectable to include with the registration data the code scanner 106 transmits to the merchant server. New address selector 974 is selectable to add a new address to the address list 972.

Figure 17:
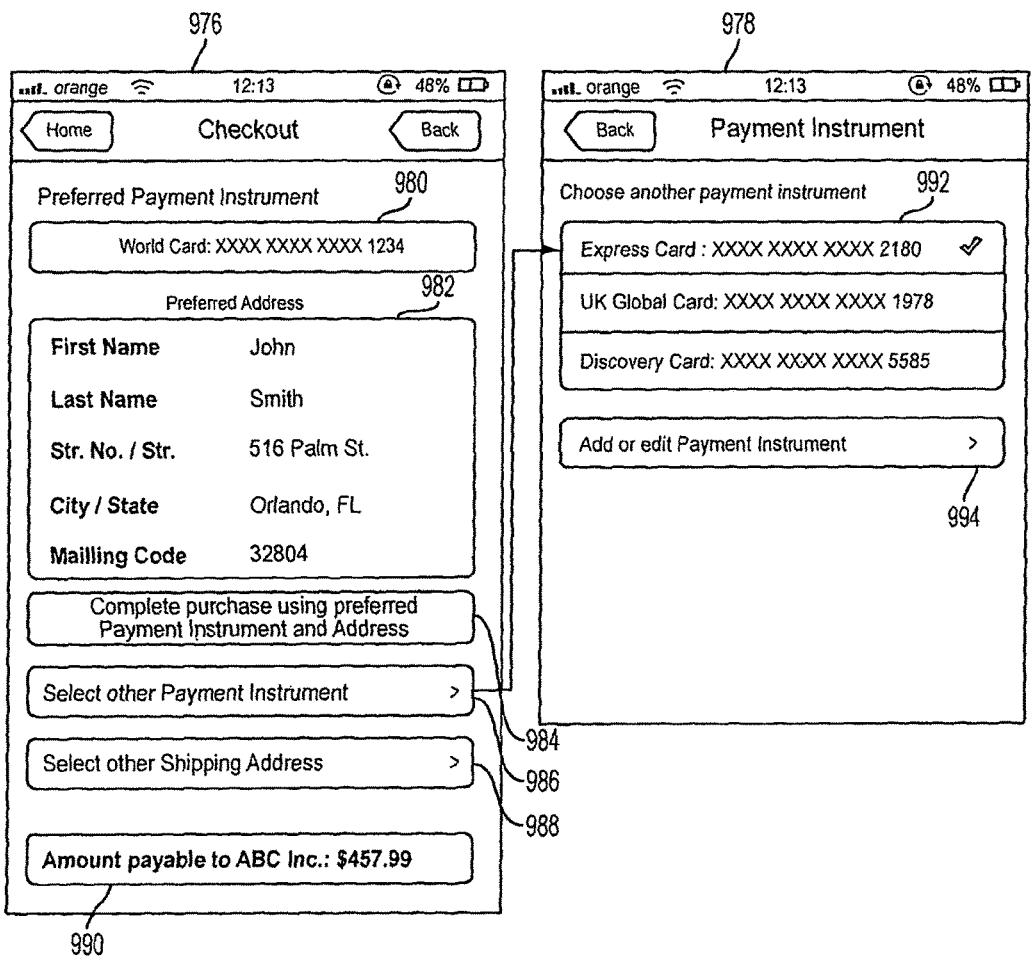
FIG. 17 illustrates additional example displays provided by a scanner application in accordance with an example embodiment.

Next, FIG. 17 illustrates example scanner app displays 976 and 978 that the scanner app 164 can provide (for example, display) in accordance with an example embodiment. Scanner app display 976 can be displayed after or in response to code scanner 106 scanning a checkout QR code, such as a checkout QR code that is part of a checkout webpage displayed on the internet-enabled device 116. Scanner app display 976 can include a preferred payment instrument selector 980 that can be selected to transmit payment instrument data (for example, block 736 in FIG. 7 and block 1036 in FIG. 10). Scanner app display 976 can include a preferred shipment address selector 982 that can be selected to transmit shipment data to merchant server 104.

Scanner app display 976 can include a payment instrument and shipping address selector 984 that can be selected to use the payment instrument and shipment address displayed on scanner app display 976. Selecting payment instrument and shipping address selector 984 can cause code scanner 106 to transmit data pertaining to the preferred payment instrument and the preferred shipping address to the merchant server so as to complete a purchase of item(s) in the virtual shopping cart.

Scanner app 976 includes a new payment selector 986 that can be selected to cause scanner app 164 to display scanner app display 978. Scanner app 976 can include a new shipping address selector 988 that can be selected to cause scanner app 164 to display a scanner app display, such as scanner app display 956, to allow for selection or entry of a new shipping address. Scanner app 976 can also include an amount due identifier 990 to provide notice of a payment amount that will be made in response to selecting payment instrument and shipping address selector 984.

The scanner app display 978 includes a payment instrument selector 992 from which another payment instrument can be selected from one or more other displayed payment instruments. Scanner app display 978 can be displayed after selecting payment instrument and shipping address selector 984. Scanner app display 978 shows three other payment instruments (an Express Card, a UK Global Card, and a Discovery Card), but a different number of payment instruments can be displayed. The scanner app display 978 can include payment instrument selector 994 to add a new payment instrument to payment instrument selector 992 or to edit data regarding the preferred payment instrument or data regarding a payment instrument identified on payment instrument selector 992.

In accordance with alternative embodiments, a scanner app display for checkout can include the preferred payment instrument selector 980 but not the preferred shipment address selector 982, and another scanner app display for checkout can include the preferred shipment address selector 982 but not the preferred payment instrument selector 980.

V. Additional Example Embodiments

V. Conclusion

Example embodiments have been described above. Those skilled in the art will understand that changes and modifications can be made to the described embodiments without departing from the true scope and spirit of the present invention, which is defined by the claims.

This detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be used, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including in substantially concurrent or in reverse order, depending on the functionality involved. Further, more or fewer steps, blocks and/or functions can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer-readable medium such as a storage device including a disk or hard drive or other storage media.

The computer-readable medium can include non-transitory computer-readable media such as computer-readable media that stores data for short periods of time like register memory, processor cache, and/or random access memory (RAM). The computer-readable media can include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media can be any other volatile or non-volatile storage systems. A computer-readable medium can be considered a computer-readable storage medium, for example, or a tangible storage device.

The program code and/or related data may also be transitory. For example, the program code and/or related data may be embodied as a signal provided via a network, or via any other suitable means, from a remote location.

Moreover, a step or block that represents one or more information transmissions can correspond to information transmissions between software and/or hardware modules in the same physical device. However, other information transmissions can be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting.

The invention claimed is:

1. A method performed by a merchant server, the method comprising:
    sending, to a computing device, a login webpage of a website comprising multiple webpages, wherein the website is associated with (i) a website identification code provided to the merchant server while registering the multiple webpages at an application server, and (ii) a call-back login uniform resource locator;
    sending, to the computing device, the website identification code and a session identifier that identifies a communication session between the merchant server and the computing device;
    sending an encryption key to the computing device;
    receiving a transmission sent to the call-back login uniform resource locator from a code scanner, wherein the transmission comprises: (i) the session identifier that is recovered by the code scanner by scanning a non-textual representation of (a) the website identification code, (b) the encryption key, and (c) the session identifier displayed by the computing device and (ii) login credentials corresponding to an existing account associated with the merchant server, wherein the received login credentials are encrypted by the code scanner using the encryption key represented by the non-textual representation;
    decrypting the login credentials using the encryption key;
    determining that the decrypted login credentials correspond to the existing account; and
    sending, to the computing device during the communication session, a message indicating that the decrypted login credentials correspond to the existing account.

2. The method of claim 1, wherein sending the session identifier to the computing device comprises sending data embodying the non-textual representation of the website identification code and the session identifier.

3. The method of claim 1, wherein the non-textual representation is a quick response (QR) code.

4. The method of claim 1, wherein sending the encryption key comprises sending data embodying the non-textual representation that represents the session identifier and the encryption key.

5. The method of claim 1, wherein the login credentials comprise data representing one or more of (i) a username corresponding to the existing account and (ii) a password corresponding to the existing account.

6. The method of claim 1, further comprising, prior to receiving the login credentials from the code scanner:

receiving invalid login credentials from the code scanner;

determining that the invalid login credentials do not correspond to an existing account associated with the merchant server; and sending, to the computing device, a message indicating that the invalid login credentials do not correspond to an existing account associated with the merchant server.

7. A non-transitory computer-readable storage medium storing thereon instructions that when executed by a merchant server cause the merchant server to perform functions comprising:

sending, to a computing device, a login webpage of a website comprising multiple webpages, wherein the website is associated with (i) a website identification code provided to the merchant server while registering the multiple webpages at an application server, and (ii) a call-back login uniform resource locator;

sending, to the computing device, the website identification code and a session identifier that identifies a communication session between the merchant server and the computing device;

sending an encryption key to the computing device;

receiving a transmission sent to the call-back login uniform resource locator from a code scanner, wherein the transmission comprises: (i) the session identifier that is recovered by the code scanner by scanning a non-textual representation of (a) the website identification code, (b) the encryption key, and (c) the session identifier displayed by the computing device and (ii) login credentials corresponding to an existing account associated with the merchant server, wherein the received login credentials are encrypted by the code scanner using the encryption key represented by the non-textual representation;

decrypting the login credentials using the encryption key;

determining that the decrypted login credentials correspond to the existing account; and sending, to the computing device during the communication session, a message indicating that the decrypted login credentials correspond to the existing account.

8. The non-transitory computer-readable storage medium of claim 7, wherein sending the session identifier to the computing device comprises sending data embodying the website identification code and the non-textual representation of the session identifier.

9. The non-transitory computer-readable storage medium of claim 7, wherein the non-textual representation is a quick response (QR) code.

10. A merchant server comprising:

one or more processors; and a non-transitory computer-readable storage medium storing thereon instructions that when executed by the one or more processors cause the merchant server to perform functions comprising:

sending, to a computing device, a login webpage of a website comprising multiple webpages, wherein the website is associated with (i) a website identification code provided to the merchant server while registering the multiple webpages at an application server, and (ii) a call-back login uniform resource locator;

sending, to the computing device, the website identification code and a session identifier that identifies a communication session between the merchant server and the computing device;

sending an encryption key to the computing device;

receiving a transmission sent to the call-back login uniform resource locator from a code scanner, wherein the transmission comprises: (i) the session identifier that is recovered by the code scanner by scanning a non-textual representation of (a) the website identification code, (b) the encryption key, and (c) the session identifier displayed by the computing device and (ii) login credentials corresponding to an existing account associated with the merchant server, wherein the received login credentials are encrypted by the code scanner using the encryption key represented by the non-textual representation;

decrypting the login credentials using the encryption key;

determining that the decrypted login credentials correspond to the existing account; and sending, to the computing device during the communication session, a message indicating that the decrypted login credentials correspond to the existing account.

11. The merchant server of claim 10, wherein sending the encryption key comprises sending data embodying the non-textual representation that represents the session identifier and the encryption key.

12. The merchant server of claim 10, wherein the login credentials comprise data representing one or more of (i) a username corresponding to the existing account and (ii) a password corresponding to the existing account.

13. The merchant server of claim 10, wherein the functions further comprise, prior to receiving the login credentials from the code scanner:

receiving invalid login credentials from the code scanner;

determining that the invalid login credentials do not correspond to an existing account associated with the merchant server; and sending, to the computing device, a message indicating that the invalid login credentials do not correspond to an existing account associated with the merchant server.

14. The merchant server of claim 10, wherein the non-textual representation is a quick response (QR) code.

15. The method of claim 1, wherein the multiple webpages comprise a registration webpage having a field to insert registration data regarding a user.

16. The method of claim 1, wherein the multiple webpages comprise a shopping webpage.

17. The method of claim 16, further comprising:

updating, after determining the login credentials correspond to the existing account, the login webpage to provide a user with access to the shopping webpage.

18. The method of claim 16, wherein the multiple webpages comprise a checkout webpage that displays (i) contents of a shopping cart, (ii) an amount due, or (iii) the contents of the shopping cart and the amount due.

* * * * *